(12) United States Patent
Islam et al.

(10) Patent No.: US 10,893,551 B2
(45) Date of Patent: Jan. 12, 2021

(54) NUMEROLOGY DEPENDENT COMMUNICATION TIMING

(71) Applicant: QUALCOMM Incorporated, San Diego, CA (US)

(72) Inventors: Muhammad Nazmul Islam, Edison, NJ (US); Tao Luo, San Diego, CA (US); Sony Akkarakaran, Poway, CA (US); Hung Ly, San Diego, CA (US); Bilal Sadiq, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/914,787

(22) Filed: Mar. 7, 2018

(65) Prior Publication Data

US 2018/0263064 A1 Sep. 13, 2018

Related U.S. Application Data

(60) Provisional application No. 62/470,252, filed on Mar. 11, 2017, provisional application No. 62/557,127, filed on Sep. 11, 2017.

(51) Int. Cl.
*H04W 74/08* (2009.01)
*H04W 72/12* (2009.01)
(Continued)

(52) U.S. Cl.
CPC ....... *H04W 74/0891* (2013.01); *H04L 5/0053* (2013.01); *H04L 27/2602* (2013.01);
(Continued)

(58) Field of Classification Search
CPC ......... H04W 74/0891; H04W 74/0833; H04W 72/042; H04W 72/0446; H04W 72/205;
(Continued)

(56) References Cited

U.S. PATENT DOCUMENTS 9,344,985 B2 5/2016 Loehr et al.
2010/0195636 A1 8/2010 Nakashima et al.
(Continued)

FOREIGN PATENT DOCUMENTS

| EP | 3277042 A1 | 1/2018 |
|---|---|---|
| EP | 3277047 A2 | 1/2018 |
| WO | WO2016153548 A1 | 9/2016 |

OTHER PUBLICATIONS

International Search Report and Written Opinion—PCT/US2018/021540—ISA/EPO—dated Jun. 11, 2018 (173280U2W0).
(Continued)

*Primary Examiner* — Habte Mered
(74) *Attorney, Agent, or Firm* — Holland & Hart LLP

(57) ABSTRACT

Methods, systems, and devices for communication timing (e.g., random access channel (RACH) timing) in a wireless communication are described. A base station and a user equipment (UE) may perform a communication procedure (e.g., to establish a communication link between the base station the UE). The communication timing associated with the communication procedure may depend on the numerology used for the communication procedure and may be conveyed by the base station to the UE in a control message or via system information. In some cases, the numerology may indicate the communication timing.

26 Claims, 16 Drawing Sheets

(51) Int. Cl.
  *H04W 72/04* (2009.01)
  *H04W 56/00* (2009.01)
  *H04L 5/00* (2006.01)
  *H04L 27/26* (2006.01)
(52) U.S. Cl.
  CPC ..... *H04W 56/0015* (2013.01); *H04W 72/042* (2013.01); *H04W 72/0446* (2013.01); *H04W 72/1205* (2013.01); *H04W 72/1289* (2013.01); *H04W 74/0833* (2013.01); *H04L 5/0007* (2013.01)
(58) Field of Classification Search
  CPC ......... H04W 72/1289; H04W 56/0015; H04W 72/1205; H04L 5/00; H04L 5/0053; H04L 5/0007; H04L 27/2602
  See application file for complete search history.

(56) References Cited

U.S. PATENT DOCUMENTS

| | | |
|---|---|---|
| 2010/0309877 A1 | 12/2010 | Damnjanovic et al. |
| 2014/0317461 A1 | 10/2014 | Li et al. |
| 2016/0057770 A1 | 2/2016 | Yerramalli et al. |
| 2016/0150532 A1 | 5/2016 | Bhushan et al. |
| 2016/0255580 A1 | 9/2016 | Onaka et al. |
| 2016/0262179 A1 | 9/2016 | Choi et al. |
| 2016/0270038 A1 | 9/2016 | Papasakellariou |
| 2016/0374048 A1 | 12/2016 | Griot et al. |
| 2017/0013564 A1 | 1/2017 | Yi et al. |
| 2017/0048047 A1 | 2/2017 | Kadous et al. |
| 2017/0201968 A1* | 7/2017 | Nam .............. H04W 4/70 |
| 2017/0311326 A1 | 10/2017 | Wong et al. |
| 2018/0049047 A1* | 2/2018 | Lin ............... H04W 72/04 |
| 2018/0049169 A1* | 2/2018 | Lin ............... H04W 72/042 |
| 2018/0098298 A1* | 4/2018 | Jung ............. H04W 56/0015 |
| 2018/0138946 A1 | 5/2018 | Sergi |
| 2018/0167901 A1 | 6/2018 | Wang et al. |
| 2018/0263063 A1 | 9/2018 | Islam et al. |
| 2019/0037606 A1* | 1/2019 | Takeda ............ H04W 88/06 |
| 2019/0068427 A1 | 2/2019 | Hwang et al. |
| 2019/0104550 A1 | 4/2019 | Yang et al. |
| 2019/0223157 A1 | 7/2019 | Hwang et al. |
| 2020/0053677 A1* | 2/2020 | Tiirola ........... H04W 72/0446 |

OTHER PUBLICATIONS

Motorola Mobility, et al., "PRACH for an NR Carrier Supporting Multiple Numerologies," 3GPP Draft; R1-1703045, PRACH for Multiple Numerologies, 3rd Generation Partnership Project (3GPP), Mobile Competence Centre; 650, Route Des Lucioles; F-0692, Sophia-Antipolis Cedex; France, vol. RAN WG1, No. Athens, Greece; Feb. 13, 2017-Feb. 17, 2017, Feb. 12, 2017, 3 pages, XP051210184, retrieved from the internet: URL: http://www.3gpp.org/ftp/Meetings_3GPP_SYNC/RAN1/Docs/ [retrieved on Feb. 12, 2017].

Qualcomm Incorporated: "4-Step RACH Procedure Consideration," 3GPP Draft; R1-1702593, 4-step RACH Procedure Consideration, 3rd Generation Partnership Project (3GPP), Mobile Competence Centre; 650, Route Des Lucioles; F-06921, Sophia-Antipolis Cedex; France, vol. RAN WG1, No. Athens, Greece; Feb. 13, 2017-Feb. 17, 2017, Feb. 12, 2017, 13 Pages, XP051209747, Retrieved from the Internet: http://www.3gpp.org/ftp/Meetings_3GPP_SYNC/RAN1/Docs/ [retrieved on Feb. 12, 2017].

* cited by examiner

NUMEROLOGY DEPENDENT COMMUNICATION TIMING

CROSS REFERENCES

The present Application for Patent claims priority to U.S. Provisional Patent Application No. 62/470,252 by Islam et al., entitled "NUMEROLOGY DEPENDENT RANDOM ACCESS TIMING," filed Mar. 11, 2017, and to U.S. Provisional Patent Application No. 62/557,127 by Islam et al., entitled "NUMEROLOGY DEPENDENT RANDOM ACCESS TIMING," filed Sep. 11, 2017, each which is assigned to the assignee hereof.

BACKGROUND

The following relates generally to wireless communication and more specifically to numerology dependent communication timing.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In wireless communications systems, a random access channel (RACH) procedure may be performed between a UE and a base station in order for the UE to acquire and attach to a particular cell served by the base station. During the RACH procedure, a base station and a UE may exchange random access messages that are communicated at certain times according to a RACH timing for the RACH procedure. The RACH timing may be specified based on a given time interval, such as a subframe, however, some wireless communications systems may support varying durations for a subframe, which may lead to inconsistent RACH timing for the RACH procedure.

SUMMARY

The described techniques relate to improved methods, systems, devices, or apparatuses that support numerology dependent communication timing. Generally, the described techniques provide for different numerologies to be used in a communication procedure such as random access channel (RACH) procedure. Different communication timings for the communication procedure may be based on the numerology used for the communication procedure and an indication of the communication timing may be transmitted from a base station to a user equipment (UE). In some cases, the indication of the communication timing may include an indication of the numerology to be used for the communication procedure and the numerology may indicate the communication timing. Numerology may refer to a given tone spacing (i.e., the bandwidth between each tone or subcarrier in the frequency domain), symbol duration (i.e., the time interval designated as a single time resource), number of tones within a carrier (i.e., the number of subcarriers spanning a given component carrier for wireless communication), the number of symbols spanning a frame, subframe, slot, mini-slot, or any other time interval of the wireless network, etc.

A method of wireless communications is described. The method may include receiving, from a base station, an indication of a numerology to be used for a communication procedure, determining a minimum time gap for the communication procedure based at least in part on the numerology, and communicating with the base station in accordance with the minimum time gap.

An apparatus for wireless communications is described. The apparatus may include means for receiving, from a base station, an indication of a numerology to be used for a communication procedure, means for determining a minimum time gap for the communication procedure based at least in part on the numerology, and means for communicating with the base station in accordance with the minimum time gap.

Another apparatus for wireless communications is described. The apparatus may include a processor, memory in electronic communication with the processor, and instructions stored in the memory. The instructions may be operable to cause the processor to receive, from a base station, an indication of a numerology to be used for a communication procedure, determine a minimum time gap for the communication procedure based at least in part on the numerology, and communicate with the base station in accordance with the minimum time gap.

A non-transitory computer-readable medium for wireless communications is described. The non-transitory computer-readable medium may include instructions operable to cause a processor to receive, from a base station, an indication of a numerology to be used for a communication procedure, determine a minimum time gap for the communication procedure based at least in part on the numerology, and communicate with the base station in accordance with the minimum time gap.

In some examples of the method, apparatus, and non-transitory computer-readable medium described above, the minimum time gap may be a minimum wait time for a user equipment (UE) between receipt of a downlink message and transmission of an uplink message in response to the downlink message.

In some examples of the method, apparatus, and non-transitory computer-readable medium described above, the downlink message may be a grant received via a physical downlink control channel (PDCCH) and the uplink message may be transmitted via a physical uplink shared channel (PUSCH).

In some examples of the method, apparatus, and non-transitory computer-readable medium described above, the downlink message may be received via a physical downlink shared channel (PDSCH) and the uplink message may be transmitted via a physical uplink control channel (PUCCH).

In some examples of the method, apparatus, and non-transitory computer-readable medium described above, receiving the indication of the numerology comprises: receiving the indication of the numerology via one or more of a master information block (MIB), remaining minimum system information (RMSI), a system information block (SIB), a physical downlink control channel (PDCCH), a radio resource control (RRC) message, a primary synchronization signal (PSS), a secondary synchronization signal (SSS), a tertiary synchronization signal, or combinations thereof.

In some examples of the method, apparatus, and non-transitory computer-readable medium described above, the minimum time gap may be an absolute time or a default number of symbols.

In some examples of the method, apparatus, and non-transitory computer-readable medium described above, the communication procedure may be a random access channel (RACH) procedure.

In some examples of the method, apparatus, and non-transitory computer-readable medium described above, the minimum time gap may be a minimum wait time for a user equipment (UE) between receipt of a successfully decoded random access response (RAR) in a physical downlink shared channel (PDSCH) and a radio resource control (RRC) connection request transmission.

A method of wireless communications is described. The method may include identifying a numerology for a communication procedure, conveying, to a user equipment (UE), an indication of the numerology, wherein the numerology is indicative of a minimum time gap for the communication procedure, and communicating with the UE in accordance with the minimum time gap.

An apparatus for wireless communications is described. The apparatus may include means for identifying a numerology for a communication procedure, means for conveying, to a user equipment (UE), an indication of the numerology, wherein the numerology is indicative of a minimum time gap for the communication procedure, and means for communicating with the UE in accordance with the minimum time gap.

Another apparatus for wireless communications is described. The apparatus may include a processor, memory in electronic communication with the processor, and instructions stored in the memory. The instructions may be operable to cause the processor to identify a numerology for a communication procedure, convey, to a user equipment (UE), an indication of the numerology, wherein the numerology is indicative of a minimum time gap for the communication procedure, and communicate with the UE in accordance with the minimum time gap.

A non-transitory computer-readable medium for wireless communications is described. The non-transitory computer-readable medium may include instructions operable to cause a processor to identify a numerology for a communication procedure, convey, to a user equipment (UE), an indication of the numerology, wherein the numerology is indicative of a minimum time gap for the communication procedure, and communicate with the UE in accordance with the minimum time gap.

In some examples of the method, apparatus, and non-transitory computer-readable medium described above, the minimum time gap may be a minimum time between transmission of a downlink message and receipt of an uplink message in response to the downlink message.

In some examples of the method, apparatus, and non-transitory computer-readable medium described above, the downlink message may be a grant received via a physical downlink control channel (PDCCH) and the uplink message may be transmitted via a physical uplink shared channel (PUSCH).

In some examples of the method, apparatus, and non-transitory computer-readable medium described above, the downlink message may be received via a physical downlink shared channel (PDSCH) and the uplink message may be transmitted via a physical uplink control channel (PUCCH).

In some examples of the method, apparatus, and non-transitory computer-readable medium described above, conveying the indication of the numerology comprises: conveying the indication of the numerology via one or more of a master information block (MIB), remaining minimum system information (RMSI), a system information block (SIB), a physical downlink control channel (PDCCH), a radio resource control (RRC) message, a primary synchronization signal (PSS), a secondary synchronization signal (SSS), a tertiary synchronization signal, or combinations thereof.

In some examples of the method, apparatus, and non-transitory computer-readable medium described above, the minimum time gap may be an absolute time or a default number of symbols.

In some examples of the method, apparatus, and non-transitory computer-readable medium described above, the communication procedure may be a random access channel (RACH) procedure.

In some examples of the method, apparatus, and non-transitory computer-readable medium described above, the minimum time gap may be a minimum wait time for the UE between receipt of a successfully decoded random access response (RAR) in a physical downlink shared channel (PDSCH) and response radio resource control (RRC) connection request transmission.

A method of wireless communications is described. The method may include identifying that a random access channel (RACH) procedure is to be performed, receiving, at a user equipment (UE), an indication of a numerology to be used for the RACH procedure, and determining a RACH timing to be used by the UE based at least in part on the numerology 2.

An apparatus for wireless communications is described. The apparatus may include means for identifying that a random access channel (RACH) procedure is to be performed, means for receiving, at a user equipment (UE), an indication of a numerology to be used for the RACH procedure, and means for determining a RACH timing to be used by the UE based at least in part on the numerology 2.

Another apparatus for wireless communications is described. The apparatus may include a processor, memory in electronic communication with the processor, and instructions stored in the memory. The instructions may be operable to cause the processor to identify that a random access channel (RACH) procedure is to be performed, receive, at a user equipment (UE), an indication of a numerology to be used for the RACH procedure, and determine a RACH timing to be used by the UE based at least in part on the numerology 2.

A non-transitory computer-readable medium for wireless communications is described. The non-transitory computer-readable medium may include instructions operable to cause a processor to identify that a random access channel (RACH) procedure is to be performed, receive, at a user equipment (UE), an indication of a numerology to be used for the RACH procedure, and determine a RACH timing to be used by the UE based at least in part on the numerology 2.

In some examples of the method, apparatus, and non-transitory computer-readable medium described above, receiving the indication of the numerology comprises: receiving the indication of the numerology via one or more of a master information block (MIB), remaining minimum system information (RMSI), a system information block (SIB), a physical downlink control channel (PDCCH), a radio resource control (RRC) message, a primary synchronization signal (PSS), a secondary synchronization signal (SSS), a tertiary synchronization signal, or combinations thereof.

In some examples of the method, apparatus, and non-transitory computer-readable medium described above, the PDCCH corresponds to a PDCCH of a random access response (RAR) grant.

In some examples of the method, apparatus, and non-transitory computer-readable medium described above, the RRC message may be received through a payload of a random access response (RAR).

In some examples of the method, apparatus, and non-transitory computer-readable medium described above, determining the RACH timing comprises: determining an absolute amount of time to be used during portions of the RACH procedure.

In some examples of the method, apparatus, and non-transitory computer-readable medium described above, determining the RACH timing comprises: determining a number of symbols to be used during portions of the RACH procedure.

In some examples of the method, apparatus, and non-transitory computer-readable medium described above, determining the RACH timing comprises: determining the number of symbols to be used during portions of the RACH procedure including a minimum number of symbols that the UE may be to wait between receipt of an unsuccessfully decoded random access response (RAR) in a physical downlink shared channel (PDSCH) and when the UE may be ready to retransmit a RACH message.

In some examples of the method, apparatus, and non-transitory computer-readable medium described above, determining the RACH timing comprises: determining the number of symbols to be used during portions of the RACH procedure including a minimum number of symbols that the UE may be to wait between a last symbol of a random access response (RAR) window in which no RAR may be received and when the UE may be ready to retransmit a RACH message.

In some examples of the method, apparatus, and non-transitory computer-readable medium described above, determining the RACH timing comprises: determining the number of symbols to be used during portions of the RACH procedure including a minimum number of symbols that the UE may be to wait between initiation of a physical downlink control channel (PDCCH) order and a RACH message to be transmitted by the UE.

In some examples of the method, apparatus, and non-transitory computer-readable medium described above, determining the RACH timing comprises: determining the number of symbols to be used during portions of the RACH procedure including a minimum number of symbols that the UE may be to wait between receipt of a physical downlink control channel (PDCCH) order and a RACH message to be transmitted by the UE.

In some examples of the method, apparatus, and non-transitory computer-readable medium described above, determining the RACH timing comprises: determining the number of symbols to be used during portions of the RACH procedure including a minimum number of symbols that the UE may be to wait between receipt of a successfully decoded random access response (RAR) in a physical downlink shared channel (PDSCH) and a radio resource control (RRC) connection request to be transmitted by the UE.

In some examples of the method, apparatus, and non-transitory computer-readable medium described above, the number of symbols to be used during portions of the RACH procedure includes a minimum number of symbols that the UE may be to wait between transmission of a physical RACH (PRACH) message and a beginning of a random access response (RAR) window.

A method of wireless communications is described. The method may include identifying a numerology to be used for a random access channel (RACH) procedure and conveying, to a user equipment (UE), an indication of the RACH numerology, wherein the RACH numerology is indicative of a RACH timing for the UE.

An apparatus for wireless communications is described. The apparatus may include means for identifying a numerology to be used for a random access channel (RACH) procedure and means for conveying, to a user equipment (UE), an indication of the RACH numerology, wherein the RACH numerology is indicative of a RACH timing for the UE.

Another apparatus for wireless communications is described. The apparatus may include a processor, memory in electronic communication with the processor, and instructions stored in the memory. The instructions may be operable to cause the processor to identify a numerology to be used for a random access channel (RACH) procedure and convey, to a user equipment (UE), an indication of the RACH numerology, wherein the RACH numerology is indicative of a RACH timing for the UE.

A non-transitory computer-readable medium for wireless communications is described. The non-transitory computer-readable medium may include instructions operable to cause a processor to identify a numerology to be used for a random access channel (RACH) procedure and convey, to a user equipment (UE), an indication of the RACH numerology, wherein the RACH numerology is indicative of a RACH timing for the UE.

In some examples of the method, apparatus, and non-transitory computer-readable medium described above, conveying the indication of the numerology comprises: conveying the indication of the numerology via one or more of a master information block (MIB), remaining minimum system information (RMSI), a system information block (SIB), a physical downlink control channel (PDCCH), a radio resource control (RRC) message, a primary synchronization signal (PSS), a secondary synchronization signal (SSS), a tertiary synchronization signal, or combinations thereof.

In some examples of the method, apparatus, and non-transitory computer-readable medium described above, the PDCCH corresponds to a PDCCH of a random access response (RAR) grant.

In some examples of the method, apparatus, and non-transitory computer-readable medium described above, the RRC message may be transmitted through a payload of a random access response (RAR).

In some examples of the method, apparatus, and non-transitory computer-readable medium described above, the RACH timing comprises a number of symbols or an absolute amount of time to be used during portions of the RACH procedure.

In some examples of the method, apparatus, and non-transitory computer-readable medium described above, the RACH timing comprises a number of symbols to be used during portions of the RACH procedure including a minimum number of symbols that the UE may be to wait between receipt of a successfully decoded random access response (RAR) in a physical downlink shared channel (PDSCH) and a radio resource control (RRC) connection request.

In some examples of the method, apparatus, and non-transitory computer-readable medium described above, the RACH timing comprises a number of symbols to be used during portions of the RACH procedure including a minimum number of symbols that the UE may be to wait between receipt of an unsuccessfully decoded random access response (RAR) in a physical downlink shared channel (PDSCH) and a retransmission of a RACH message.

In some examples of the method, apparatus, and non-transitory computer-readable medium described above, the RACH timing comprises a number of symbols to be used during portions of the RACH procedure includes a minimum number of symbols that the UE may be to wait between a last symbol of a random access response (RAR) window in which no RAR may be received by the UE and retransmission of a RACH message.

In some examples of the method, apparatus, and non-transitory computer-readable medium described above, the RACH timing comprises a number of symbols to be used during portions of the RACH procedure includes a minimum number of symbols that the UE may be to wait between initiation of a physical downlink control channel (PDCCH) order and a RACH message.

In some examples of the method, apparatus, and non-transitory computer-readable medium described above, the RACH timing comprises a number of symbols to be used during portions of the RACH procedure including a minimum number of symbols that the UE may be to wait between receipt of a physical downlink control channel (PDCCH) order and a RACH message.

In some examples of the method, apparatus, and non-transitory computer-readable medium described above, the RACH timing comprises a number of symbols to be used during portions of the RACH procedure including a minimum number of symbols that the UE may be to wait between transmission of a physical RACH (PRACH) signal and a beginning of a random access response (RAR) window.

DETAILED DESCRIPTION

Figure 1:
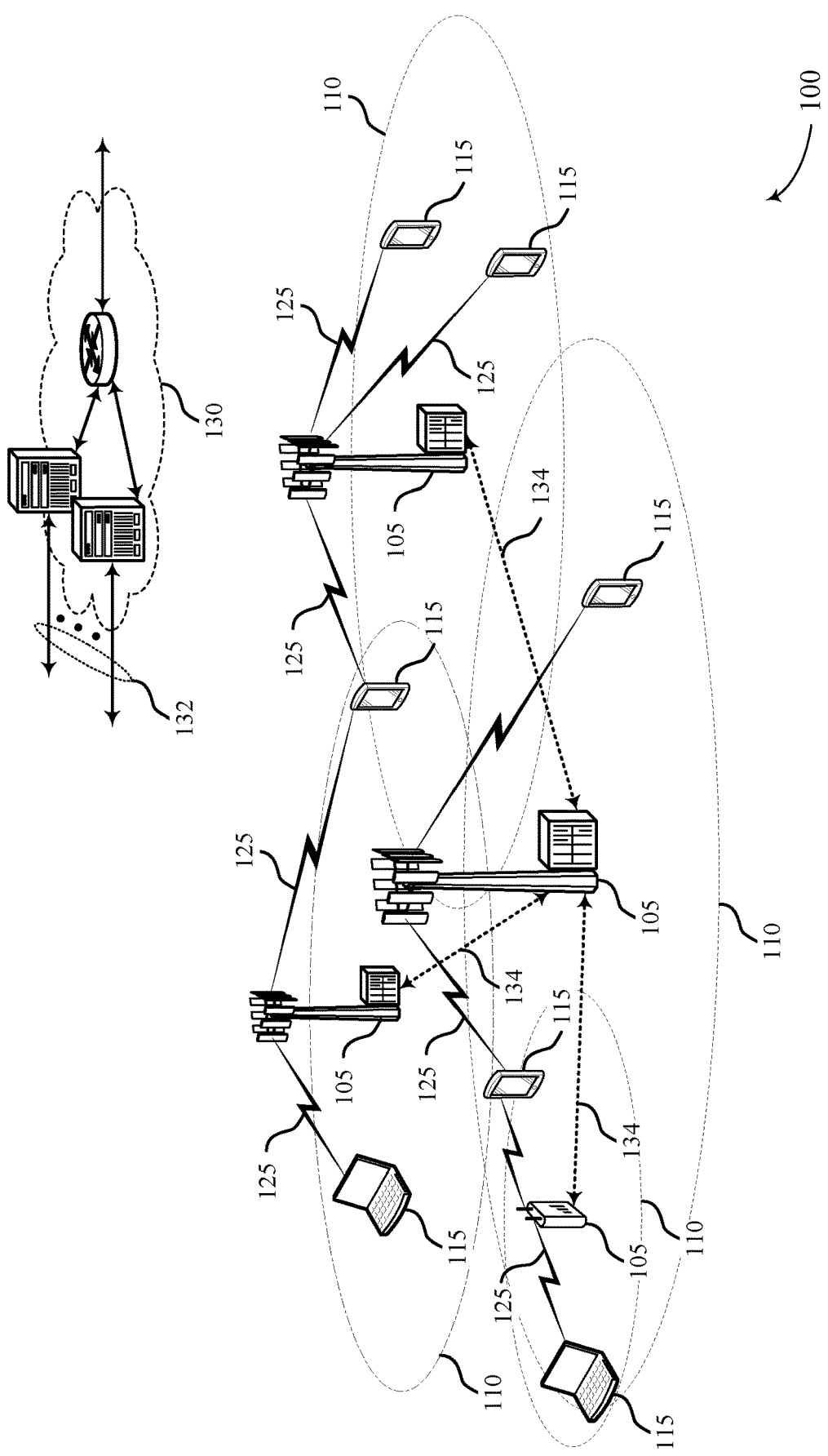
FIG. 1 illustrates an example of a wireless communications system that supports numerology dependent communication timing in accordance with aspects of the present disclosure.

A wireless communications system (e.g., a Long Term Evolution (LTE)/LTE-Advanced (LTE-A) or a New Radio (NR) system) may employ a fixed tone spacing for communication between a base station and a user equipment (UE). For instance, in an LTE/LTE-A system, the tone spacing may be the reciprocal of the symbol duration and may be selected in order to avoid or mitigate blurring caused by the Doppler shift and to maintain orthogonality between tones. However, adopting a different (or varied) tone spacing or symbol duration (i.e., numerology) may help mitigate phase noise experienced when communicating in different (e.g., higher) frequency bands. Accordingly, a wireless communications system may support different numerologies when performing different procedures, such as a random access channel (RACH) procedure.

In some aspects, a communication procedure (e.g., a RACH procedure, a handover procedure) may be performed between a base station and UE in order for the UE to acquire a cell served by the base station. The communication procedure may involve the exchange of multiple communication messages between the UE and the base station based according to a communication timing for the communication procedure. In some cases, the communication timing, including one or more minimum time gaps, may be based on the numerology associated with the communication procedure. Additionally or alternatively, one or more minimum time gaps of the communication timing may be represented in absolute time or a default number of symbols, irrespective of numerology. The communication timing may include additional timing durations supplemental to the one or more minimum timing durations. The additional timing durations may be represented in absolute time, or a number of slots, mini-slots, etc.

An indication of the communication timing may be conveyed to a UE (e.g., from a base station) via a control message (e.g., a physical downlink control channel (PDCCH) message or a radio resource control (RRC) message) or through system information (e.g., master information block (MIB) of a physical broadcast channel (PBCH), one or more system information blocks (SIBs), a minimum system information block (MSIB), remaining minimum system information (RMSI)), a primary synchronization signal (PSS), a secondary synchronization signal (SSS), or a tertiary synchronization signal. In some cases, the PDCCH may correspond to a PDCCH of a random access response (RAR) grant and the RRC message may be conveyed through a payload of a RAR. In some examples, the indication of the communication timing may be conveyed through a single indication that conveys a number of slots, mini-slots, etc. for a portion of a communication procedure. Using the single indication, a UE may determine or derive communication timing for other portions of the communication procedure. In some aspects, the communication timing may indicate the number of slots, mini-slots, etc. for a UE to wait between receipt (or lack of receipt) of a communication message from a base station and transmission of or retransmission of a communication message from the UE to the base station. In some instances, the indication of the communication timing may be an indication of the numerology used for a communication procedure, which may be used by the UE to determine the communication timing to be used for the communication procedure.

Aspects of the disclosure are initially described in the context of wireless communications systems. Aspects are then described with respect to example communication timings and a process flow. Aspects of the disclosure are further illustrated by and described with reference to apparatus diagrams, system diagrams, and flowcharts that relate to numerology dependent communication timing.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be an LTE/LTE-A network or an NR network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1). Base stations 105 may communicate with one another over backhaul links 134 (e.g., X2) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, IP connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

In some examples, higher frequency transmissions such as mmW transmissions may employ a different numerology (e.g., a tone spacing of 60, 120, or 240 kHz) than lower frequency transmissions such as sub-6 GHz transmission, which may utilize 15 or 30 kHz tone spacing. Other numerologies may be considered without departing from the scope of the present disclosure. In some cases, numerology may also differ for a communication procedure such that wireless devices such as a UE 115 and a base station 105 may transmit and receive communication messages according to a given numerology, which may be specific to the communication procedure between the UE 115 and the base station.

The described techniques provide for a communication procedure (e.g., a RACH procedure, a handover procedure) that may be performed according to different numerologies and in some examples, a UE 115 and a base station 105 may support different numerologies when performing a communication procedure. The communication procedure may be associated with a communication timing, which may indicate one or more slots, mini-slots, etc. used during portions of the communication procedure. In some cases, aspects of the communication timing may depend on the numerology used for the communication procedure and an indication of the communication timing may be conveyed from a base station 105 to a UE 115. In other cases, aspects of the communication timing may depend on an absolute time scale or default number of symbols, irrespective of numerology, and an indication of the communication timing may be conveyed from a base station 105 to a UE 115. The time scale and/or number of periods may be determined in accordance with standards or limitations at the UE 115, base station 105, or both.

The numerology for the communication procedure may indicate aspects of an associated RACH timing to be used by the base station 105 and the UE 115 during the communication procedure. Standards or limitations at the base station 105, the UE 115, or both may indicate aspects of the associated communication timing, irrespective of numerology, to be used by the base station 105 and the UE 115 during the communication procedure. In some cases, the communication timing may be indicated to a UE 115 and may define a number of subframes to use during various portions of the communication procedure. In some examples, a subframe may also be referred to as a slot, mini slot, TTI, or any other duration.

Figure 2:
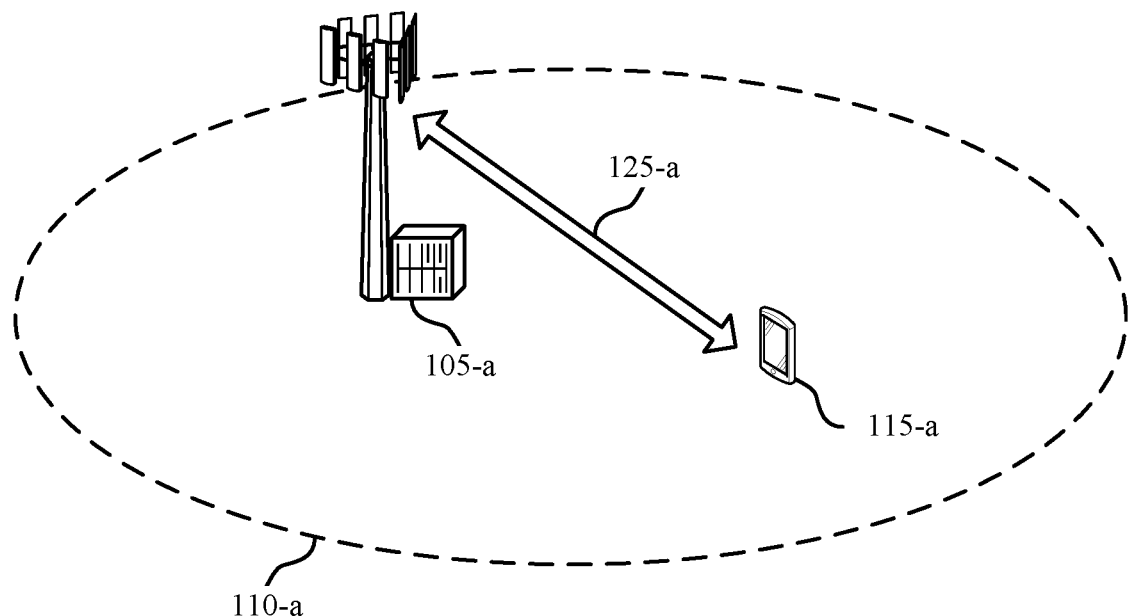
FIG. 2 illustrates an example of a wireless communications system that supports numerology dependent communication timing in accordance with aspects of the present disclosure.

FIG. 2 illustrates an example of a wireless communications system 200 that supports numerology dependent communication timing in accordance with various aspects of the present disclosure. Wireless communications system 200 includes a base station 105-a supporting communication with a UE 115-a within coverage area 110-a. Base station 105-a and UE 115-a may be examples of the corresponding devices described with reference to FIG. 1. While FIG. 2 describes an example of a RACH communication procedure, it is to be understood that any communication procedure may be considered without departing from the scope of the present disclosure.

In some examples, the base station 105-a and UE 115-a may exchange messages (e.g., data, control, RACH messages) over communication link 125-a. To establish communication link 125-a, the UE 115-a may attempt to acquire a cell served by base station 105-a by transmitting a RACH message (e.g., Msg1) to the base station 105-a. The RACH message may include a RACH preamble, which may be included in a physical RACH (PRACH) signal, and a random access radio network temporary identity (RA-RNTI) associated with the UE 115-a. After receiving the RACH message from the UE 115-a, base station 105-a may transmit a RAR message (e.g., Msg2) to the UE 115-a. The RAR message may include a temporary cell RNTI (C-RNTI), which the base station 105-a uses to identify the UE 115-a. The RAR message may also include a timing advance which informs the UE 115-a to adjust its transmission timing to account for round trip delay. The RAR message may also include an uplink grant resource for the UE 115-a. Using the uplink grant resource, the UE 115-a may transmit an RRC connection request message (e.g., Msg3) to the base station 105-a in order to establish an RRC connection with the base station 105-a. In response to Msg3, the base station 105-a may transmit a contention resolution message (e.g., Msg4) to the UE 115-a, which may include a new C-RNTI to be used by the UE 115-a for further communication.

In some instances, after transmission of the RACH preamble to the base station 105-*a*, the UE 115-*a* may not receive a RAR from the base station 105-*a*. Additionally or alternatively, after transmission of the RRC connection request message to the base station 105-*a*, the UE 115-*a* may not receive a contention resolution message from the base station 105-*a*. This may be due to the base station 105-*a* being unable to successfully receive and decode the RACH preamble or the RRC connection request message (e.g., due to poor channel conditions or low transmission power used by the UE 115-*a* for transmission, among other factors).

In some examples, the base station 105-*a* may successfully receive the RACH preamble or the RRC connection request message and transmit a RAR or contention resolution message to the UE 115-*a*, but the UE 115-*a* may not successfully receive and decode the RAR or contention resolution message. In such cases, the UE 115-*a* may wait a predetermined amount of time before retransmitting the RACH preamble or the RRC connection request message. The predetermined amount of time that the UE 115-*a* waits prior to retransmission may be defined by the RACH timing associated with the RACH procedure.

The RACH timing may also define the time interval between receipt of a RAR message from the base station 105-*a* and transmission of the RRC connection request message by the UE 115-*a*. In some cases, this time interval may be the same as the predetermined amount of time that the UE 115-*a* waits before retransmitting the RACH preamble or the RRC connection request message. Additionally or alternatively, the RACH timing may also define various other time intervals associated with a RACH procedure performed between UE 115-*a* and base station 105-*a*.

According to some aspects, the timing of the RACH procedure may depend on the numerology used for the RACH procedure. For example, wireless communications system 200 may be a NR system that supports multiple numerologies for wireless communication. In some cases, a numerology associated with a higher tone spacing (30 kHz, 60 kHz, 120 kHz, 240 kHz, 480 kHz, etc.) may be associated with a shorter slot duration. In such cases, the RACH timing may utilize a higher number of slots during various portions of the RACH procedure when compared to a numerology associated with a lower tone spacing (e.g., 7.5 kHz, 15 kHz).

In some examples, the numerology for a given RACH procedure may be selected by the base station 105-*a* and the numerology may be the same for all UEs (e.g., UE 115-*a*) attempting to perform a RACH procedure with the base station 105-*a*. In other examples, the numerology for a RACH procedure may be UE-specific. For instance, the numerology for a RACH procedure with UE 115-*a* may be selected based on capabilities of the UE 115-*a* or channel conditions.

Aspects of the RACH timing for a given RACH procedure may depend on the numerology used (e.g., selected by base station 105-*a*) for the given RACH procedure and in some cases, the RACH timing may be defined based on a number of slots or symbols allocated for different portions of the RACH procedure. In some cases, the RACH timing may be indicated to the UE 115-*a* (e.g., from base station 105-*a*) via a random access response message (e.g., a RAR grant transmitted via PDCCH, a RAR payload transmitted via a physical downlink shared channel (PDSCH)) or via control or system information (e.g., PDCCH signaling, MIB within PBCH, MSIB, RMSI, or one or more SIBs). Values associated with the RACH timing may be indicated explicitly to UE 115-*a* via the one or more indications transmitted by base station 105-*a*, or determined at UE 115-*a* based at least in part on the selected numerology as indicated in the transmission. In other cases, base station 105-*a* and UE 115-*a* may determine values associated with the RACH timing a priori in accordance with protocols of wireless communications system 200 (e.g., Standards protocols).

In some examples, aspects of the RACH timing may be determined in accordance with a required timing of the base station 105-*a*, the UE 115-*a*, or both. The RACH timing may expressed in terms of absolute time without correlation to the numerology selected by base station 105-*a*. In some cases, the RACH timing may be indicated to the UE 115-*a* (e.g., from base station 105-*a*) via a random access response message (e.g., a RAR grant transmitted via PDCCH, a RAR payload transmitted via a PDSCH) or via control or system information (e.g., PDCCH signaling, MIB within PBCH, MSIB, RMSI, or one or more SIBs). Values associated with the RACH timing may be indicated explicitly to UE 115-*a* via transmission by the base station 105-*a*. In other cases, base station 105-*a* and UE 115-*a* may determine values associated with the RACH timing a priori in accordance with protocols of wireless communications system 200 (e.g., Standards protocols).

In some examples, RACH timing may be defined with respect to reception of a PDCCH. For instance, if a PDCCH having an associated RA-RNTI is detected by UE 115-*a* in slot n, and the corresponding downlink shared channel (DL-SCH) transport block contains a response to the RACH preamble (i.e., a response to the preamble sequence) transmitted by the UE 115-*a*, the UE 115-*a* may transmit an uplink shared channel (UL-SCH) transport block in the first slot $n+k_1$, where $k_1 \geq m$ and m relates to or is equal to a value associated with an uplink delay field within the DL-SCH transport block. In some cases, m may be derived from MSIB.

In some examples, if a RAR is received by UE 115-*a* in slot n, and the corresponding DL-SCH transport block does not contain a response to the RACH preamble (i.e., a response to the preamble sequence) transmitted by the UE 115-*a*, the UE 115-*a* may transmit (or be ready to transmit) a new RACH preamble sequence no later than in slot $n+k_2$, where $k_2$ may be indicated or determined based on other RACH parameters or derived from MSIB or RMSI. In some cases, the UE 115-*a* may transmit a new RACH preamble sequence only if requested by a higher layer.

In some cases, if no random access response is received by UE 115-*a* in slot n, where slot n is the last slot of a RAR window (e.g., the time interval during which UE 115-*a* is expected to receive a RAR from base station 105-*a*), the UE 115-*a* may transmit (or be ready to transmit) a new RACH preamble sequence no later than in slot $n+k_3$, where $k_3$ may be indicated or determined based on other RACH parameters or derived from MSIB or RMSI. In some cases, the UE 115-*a* may transmit a new RACH preamble sequence only if requested by a higher layer.

In some cases, a RACH procedure may be initiated by a PDCCH order (e.g., an indication within a PDCCH message transmitted from base station 105-*a* to UE 115-*a*) in a given slot n. In such instances, the UE 115-*a* may transmit a RACH preamble in the slot $n+k_4$, where $k_4 \geq m$ and where a PRACH slot is available. In some cases, the UE 115-*a* may transmit a new RACH preamble sequence only if requested by a higher layer.

In some examples, RACH timing may be conveyed through a single indication from the base station 105-*a* to the UE 115-*a*. The single indication may be a RACH parameter transmitted by the base station 105-*a* in a synchronization signal, a random access message, or a control message.

Using the single indication, UE 115-*a* may determine other time intervals associated with various portions of the RACH procedure. For example, a UE 115-*a* may receive an indication of or a value for m, $k_1$, $k_2$, $k_3$, and/or $k_4$. In some cases, a value for m, $k_1$, $k_2$, $k_3$, and/or $k_4$ may be derived via an MSIB or RMSI.

In some aspects, the base station 105-*a* may send bit patterns (e.g., 00, 01, 10, 11) to influence RACH timing and in such cases the associated delay equals may be 6, 7, 8, or 9 subframes, respectively for the bit patterns.

Figure 3A:
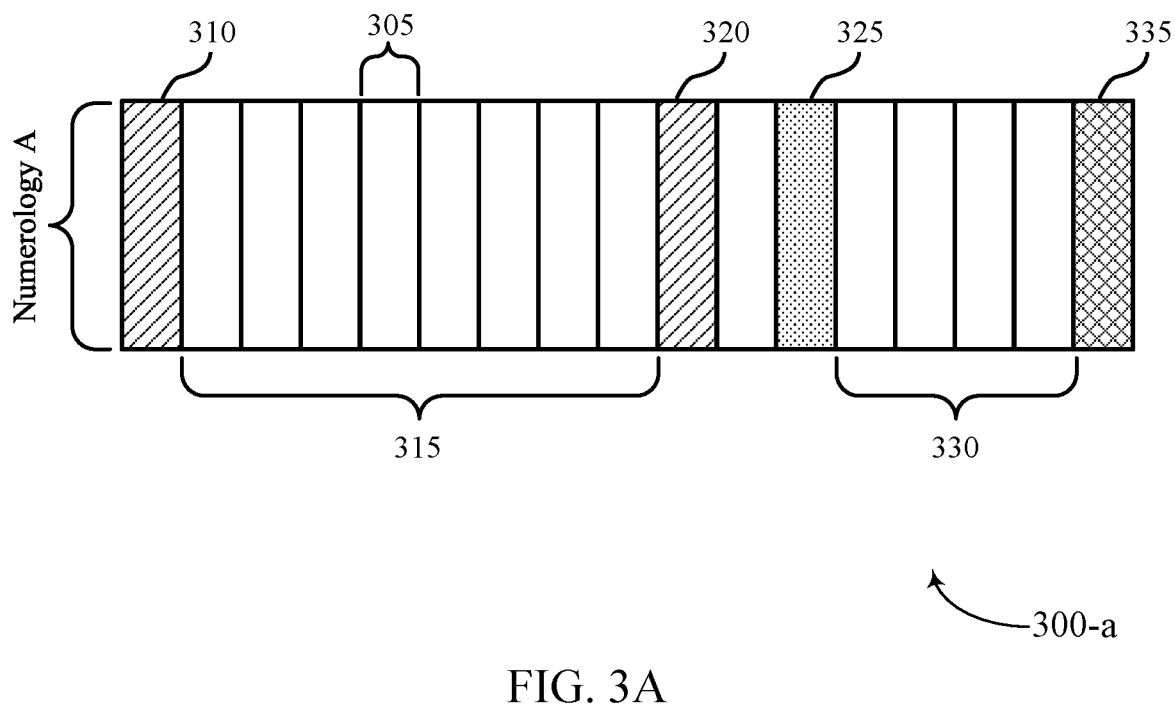
FIGS. 3A and 3B illustrate examples of communication timings that support numerology dependent communication timing in accordance with aspects of the present disclosure.
Figure 3B:
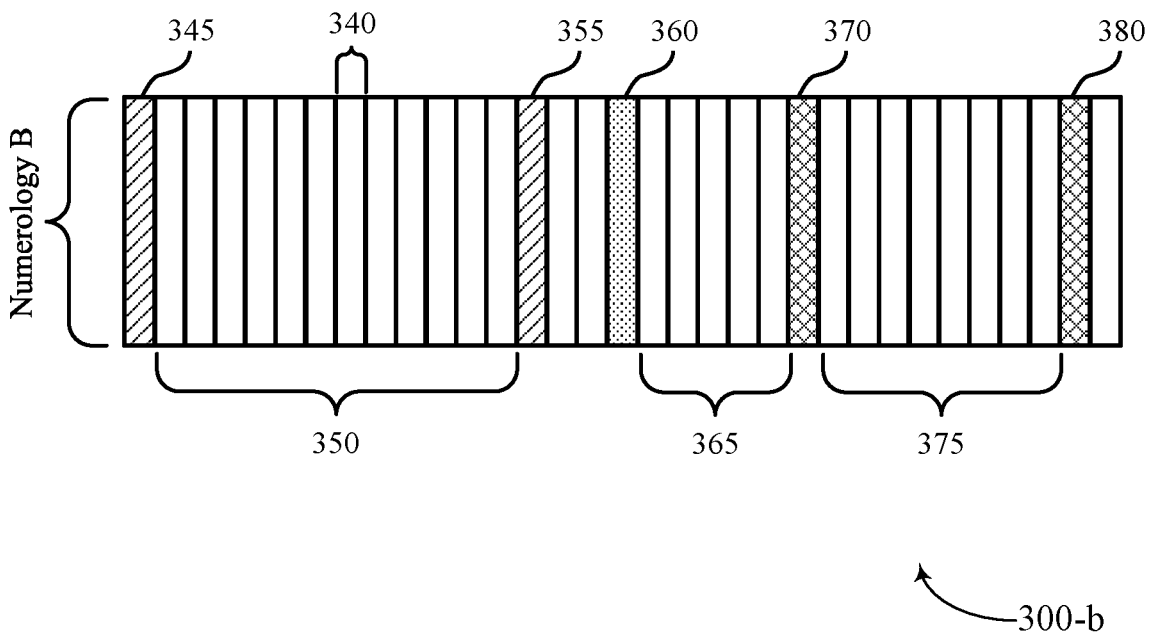

FIGS. 3A and 3B illustrate example communication timings 300, such as RACH timings, that support numerology dependent communication timing in accordance with various aspects of the present disclosure. Communication timings 300 may be supported by a wireless communications system, such as wireless communications systems 100 and 200, as described above with reference to FIGS. 1 and 2.

In FIG. 3A, communication timing 300-*a* may depend on Numerology A as shown having multiple slots associated with a given slot duration 305. An indication of the communication timing 300-*a* may be transmitted by a base station 105 to a UE 115. Communication timing 300-*a* may be indicated via a RAR message (e.g., a RAR grant transmitted via PDCCH, a RAR payload transmitted via a PDSCH) or via control or system information (e.g., PDCCH signaling, MIB within PBCH, MSIB, RMSI, or one or more SIBs). The indication may convey a number of slots or symbols to use for different portions of a communication procedure between the base station 105 and the UE 115. For instance, a UE 115 may receive a downlink message from base station 105 and subsequently transmit an uplink message in response. In this example, the communication timing may indicate the number of symbols or slots the UE 115 waits between receipt of the downlink message and transmission of the uplink message. In some examples, the downlink message may be transmitted to the UE 115 from the base station 105 via a PDCCH and the uplink message may be transmitted from the UE 115 to the base station 105 via a physical uplink shared channel (PUSCH). In some other examples, the downlink message may be transmitted to the UE 115 from the base station 105 via a PDSCH and the uplink message may be transmitted from the UE 115 to the base station 105 via a physical uplink control channel (PUCCH).

The indication may convey a number of slots to use for different portions of a communication procedure (e.g., a RACH procedure) between the base station 105 and the UE 115. For instance, a UE 115 may perform a first transmission in slot 310, as shown. Thereafter, the UE 115 may wait for reception of a response from the base station 105 during a window 315. In some cases, the duration of the window 315 may be conveyed through the indication of the communication timing. By way of example, the window spans 9 slots, though any number of slots may be allocated for the window, and the communication timing may indicate the duration of the window in terms of a number of slots (or absolute time, for example). In this case, the communication timing is indicated as 9 slots.

After having not received a response within window 315, the UE 115 retransmits the first transmission in slot 320 and receives a response in slot 325. In some cases, the time interval between slot 320 and 325 may be specified by the communication timing. After receiving a response, the UE 115 may wait a time interval 330 prior to performing a second transmission in slot 335. The time interval 330 may be determined by the UE 115, according to one or more values associated with the communication timing. The values may be specified, explicitly or implicitly, by the communication timing indicated in a transmission from the base station 105 or determined a priori by the UE 115 in accordance with protocols of the wireless communication system (e.g., Standards protocols). Time interval 330 may be expressed as a numerological maximum of the time values, including a minimum time gap T, represented in absolute time, and the output N of Equation 1 as follows:

$$N = N_i + S \quad (1)$$

where $N_i$ is representative of the smaller of the tone spacing between the response and the second transmission and S represents a fixed number of symbols. In some cases, S may be 14 symbols, as a means to ensure at least one slot gap between the response and the second transmission. Minimum time gap T may ensure at least a sufficient time gap between receipt of the successfully decoded response and a second or third transmission. The window 315 and the implicit signaling associated with time interval 330 and may vary depending on numerology for the communication procedure.

For example, the UE 115 may receive signaling corresponding to one or more values of the communication timing, including a minimum time gap T and tone spacing representative of the communication procedure. In some cases, time gap T and the tone spacing for response reception and second transmission may be explicitly signaled from the base station 105. In other cases, time gap T and the tone spacing for response reception and second transmission may be determined by the UE 115, according to the received communication timing 300-*a* and Numerology A (e.g., the UE 115-*b* may be configured to determine values of a communication timing through a look up table that indicates communication timings based on numerology). Following reception of a successful response within slot 325, the UE 115 may determine a minimum time gap T and calculate a value N of the communication interval. The UE 115 may determine the value N according to the calculated spacing $N_i$ and the indicated symbol duration S. The UE 115 may then compare values N and T, and wait a time interval 330 corresponding to the larger duration, prior to performing a second transmission in slot 335.

In other examples, T and the tone spacing for at least the response and the second transmission of the communication procedure may be a priori determined by the base station 105 and the UE 115, according to protocols of the wireless communications system (e.g., Standards protocols). Based at least in part on the determined values, the UE 115 may determine a minimum time gap T and calculate a value N of the communication interval. The UE 115 may determine the value N according to the calculated tone spacing $N_i$ and the indicated symbol duration S. The UE 115 may then compare values N and T, and wait time interval 330 corresponding to the larger duration, prior to performing the second transmission in slot 335.

In FIG. 3B, communication timing 300-*b*, which may be an example of RACH timing, may depend on Numerology B as shown having multiple slots associated with a given slot duration 340. An indication of the communication timing 300-*b* may be transmitted by a base station 105 to a UE 115. Communication timing 300-*b* may be indicated via a random access response message (e.g., a RAR grant transmitted via PDCCH, a RAR payload transmitted via a PDSCH) or via control or system information (e.g., PDCCH signaling, MIB within PBCH, MSIB, RMSI, or one or more SIBs). The indication may convey a number of slots to use for different portions of a RACH procedure between the base station 105 and the UE 115. For instance, a UE 115 may perform a Msg1 transmission in slot 345, as shown. Thereafter, the UE 115 may wait for a reception of a RAR from the base station 105 during a RAR window 350. In some cases, the duration of the RAR window 350 may be conveyed through the indication of the RACH timing. By way of example, the RAR window spans 12 slots, though any number of slots may be allocated for the RAR window, and the RACH timing may indicate the duration of the RAR window in terms of a number of slots (or absolute time). In this example, the RACH timing is indicated as 12 slots.

After having not received a RAR within RAR window 350, the UE 115 retransmits Msg1 in slot 355 and receives a RAR in slot 360. In some examples, the time interval between slot 355 and slot 360 may by determined by the UE 115, according to one or more timing values associated with the RACH timing. After receiving an RAR in slot 360, the UE 115 may wait a time interval 365 prior to performing a Msg3 transmission in slot 370. The time interval 365 may be determined by the UE 115, according to one or more timing values associated with the communication timing 300-b. The timing values may be specified, explicitly or implicitly, by the RACH timing transmission from the base station 105 or determined a priori by the UE 115 in accordance with protocols of the wireless communication system (e.g., Standards protocols). Time interval 365 may be expressed as a numerological maximum of the time values, including a minimum time gap T, represented in absolute time, and the output N of equation (1), as shown above.

For example, the UE 115 receive signaling corresponding to one or more values of the RACH timing, including a minimum time gap T and tone spacing representative of the RACH procedure. In some cases, T and the tone spacing for Msg2 reception and Msg3 transmission may be explicitly signaled from the base station 105. In other cases, T and the tone spacing may be determined by the UE 115, according to the received RACH timing 300-b and Numerology B (for example, the UE 115-b may be configured to determine values of a RACH timing through a look up table that indicates RACH timings based on numerology). Following reception of the successful RAR within slot 360, the UE 115 may determine a time gap T and calculate a value N of the RACH interval. The UE 115 may determine the value N according to the calculated spacing $N_i$ and the indicated symbol duration S. UE 115-a may then compare values N and T, and wait time interval 365 corresponding to the larger duration, prior to performing the Msg3 transmission in slot 370.

In other examples, T and the tone spacing for at least Msg2 and Msg3 of the RACH procedure may be a priori determined by the base station 105 and the UE 115, according to protocols of the wireless communications system (e.g., Standards protocols). Based at least in part on the determined values, the UE 115 may determine a minimum time gap T and calculate a value N of the RACH interval. The UE 115 may determine the value N according to the calculated tone spacing $N_i$ and the indicated symbol duration S. UE 115-a may then compare values N and T, and wait a time interval 365 corresponding to the larger duration, prior to performing a Msg3 transmission in slot 370.

After transmitting Msg3, the UE may wait during time interval 375 for reception of a Msg4 from the base station 105. The time interval 375 may be indicated by the RACH timing in a transmission from the base station. In this example, time interval 375 spans 8 slots. If the UE does not receive a Msg4 transmission from the base station 105 within time interval 375, the UE retransmits Msg3 in slot 380. The RAR window 350 and the time intervals 365 and 375 may vary depending on numerology for the RACH procedure, as shown.

Figure 4:
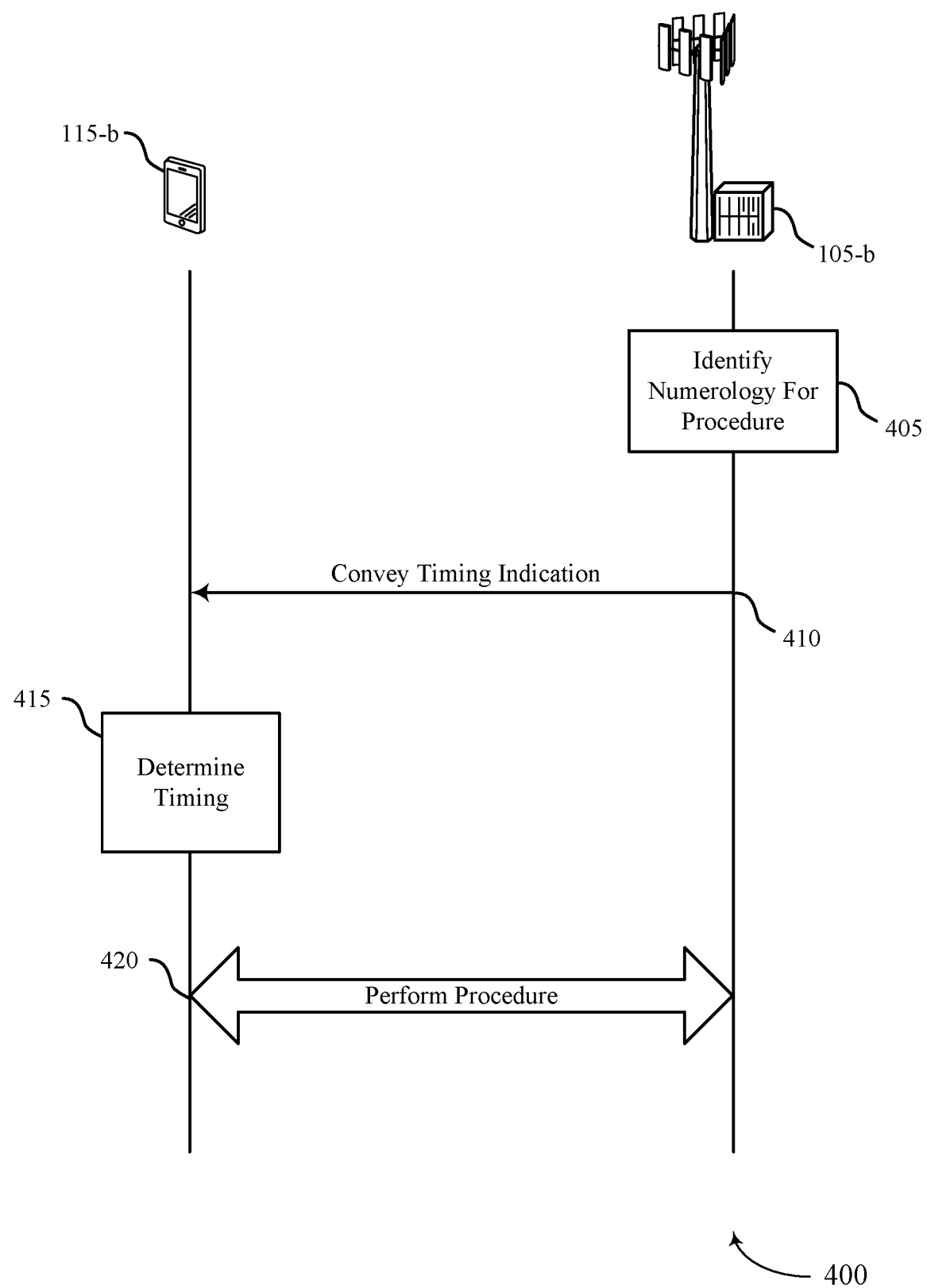
FIG. 4 illustrates an example of a process flow that supports numerology dependent communication timing in accordance with aspects of the present disclosure.

FIG. 4 illustrates an example of a process flow 400 that supports numerology dependent communication timing in accordance with various aspects of the present disclosure. Process flow 400 includes a base station 105-b and a UE 115-b, which may examples of the corresponding devices as described with reference to FIGS. 1 and 2. Process flow 400 may represent techniques performed by base station 105-b and UE 115-b in a RACH procedure, though any other communication procedure may be considered without departing from the scope of the present disclosure.

At 405, base station 105-b identifies a numerology for a RACH procedure to be performed between the base station 105-b and the UE 115-b. The numerology may be selected from a set of supported numerologies and may define the tone spacing and corresponding symbol duration for the RACH procedure.

At 410, base station 105-b conveys one or more indications of the RACH timing to the UE 115-b. In some examples, the indication of the RACH timing may be conveyed via an indication of the numerology to be used for a RACH procedure. In other examples, the indication of the RACH timing may be explicitly conveyed. The base station 105-b may convey an indication of the RACH timing via one or more of a MIB, an MSIR, RMSI, a SIB, a PDCCH, an RRC message, a PSS, an SSS, a tertiary synchronization signal, or combinations thereof. In some cases, the PDCCH may correspond to a PDCCH of an RAR grant. In some cases, the RRC message may be conveyed through a payload of a RAR. In some examples, the base station 105-b may convey an indication of the RACH timing via a RAR grant, a RAR payload, or combinations thereof. In some cases, the RAR grant is included in a PDCCH, the RAR payload is included in a PDSCH, and the MIB is included in a PBCH. In some examples, the indication may include one or more indications of the number of slots or an absolute time to be used during portions of the RACH procedure.

At 415, the UE 115-b may receive the indication of the RACH timing for a RACH procedure and determine the RACH timing. In instances where the indication is the numerology to be used for the RACH procedure, the UE 115-b may determine the RACH timing based on the numerology. For example, a relationship between numerology and RACH timing may be predetermined (e.g., the UE 115-b may be configured to determine a RACH timing through a look up table that indicates RACH timings based on numerology). In other instances, the indication may include the RACH timing itself.

The RACH timing may indicate the number of slots or symbols to be used during portions of the RACH procedure. The number of slots may be based at least in part on the numerology. The RACH timing may indicate a minimum number of slots or a minimum time gap that the UE 115-b is to wait between receipt of a successfully decoded RAR in a PDSCH and a RACH response, such as an RRC connection request, to be transmitted by the UE 115-b. In some cases, the RACH response may be an RRC connection request. The number of slots or time gap may be determined by the UE 115-b, according to one or more values associated with the RACH timing. The values may be specified, explicitly or implicitly, by the RACH timing, or determined a priori in accordance with the protocols of the wireless communications system. In some cases, the number of slots or time gap may be expressed as the numerological maximum of a configured minimum time gap, and a representative value associated with the tone spacing of one or more steps of the RACH procedure (e.g., Msg2 transmission and Msg3 reception) and a fixed symbol period. In some examples, a number of slots for portions of the RACH procedure may be determined using a single indication. In some cases, the time gap may be a minimum wait time for the UE 115-*b* between the receipt of a downlink message and transmission of an uplink message in response to the downlink message.

The RACH timing may indicate a minimum number of slots that the UE 115-*b* is to wait between receipt of an unsuccessfully decoded RAR in a PDSCH and when the UE 115-*b* is ready to retransmit a RACH message. The RACH timing may be used to determine a minimum number of slots that the UE 115-*b* is to wait between a last slot of a RAR window in which no RAR is received and when the UE 115-*b* is ready to retransmit a RACH message. The RACH timing may be used to determine a minimum number of slots that the UE 115-*b* is to wait between initiation of a PDCCH order and a RACH message to be transmitted by the UE 115-*b*. In some cases, the RACH message may be a PRACH signal. The RACH timing may be used to determine a minimum number of slots that the UE 115-*b* is to wait between receipt of a PDCCH order and a RACH message to be transmitted by the UE 115-*b*. The RACH timing may be used to determine a minimum number of symbols that the UE 115-*b* is to wait between transmission of a PRACH signal and a beginning of an RAR window.

At 420, the UE 115-*b* and the base station 105-*b* may perform a RACH procedure based on the RACH timing determined at 415.

Figure 5:
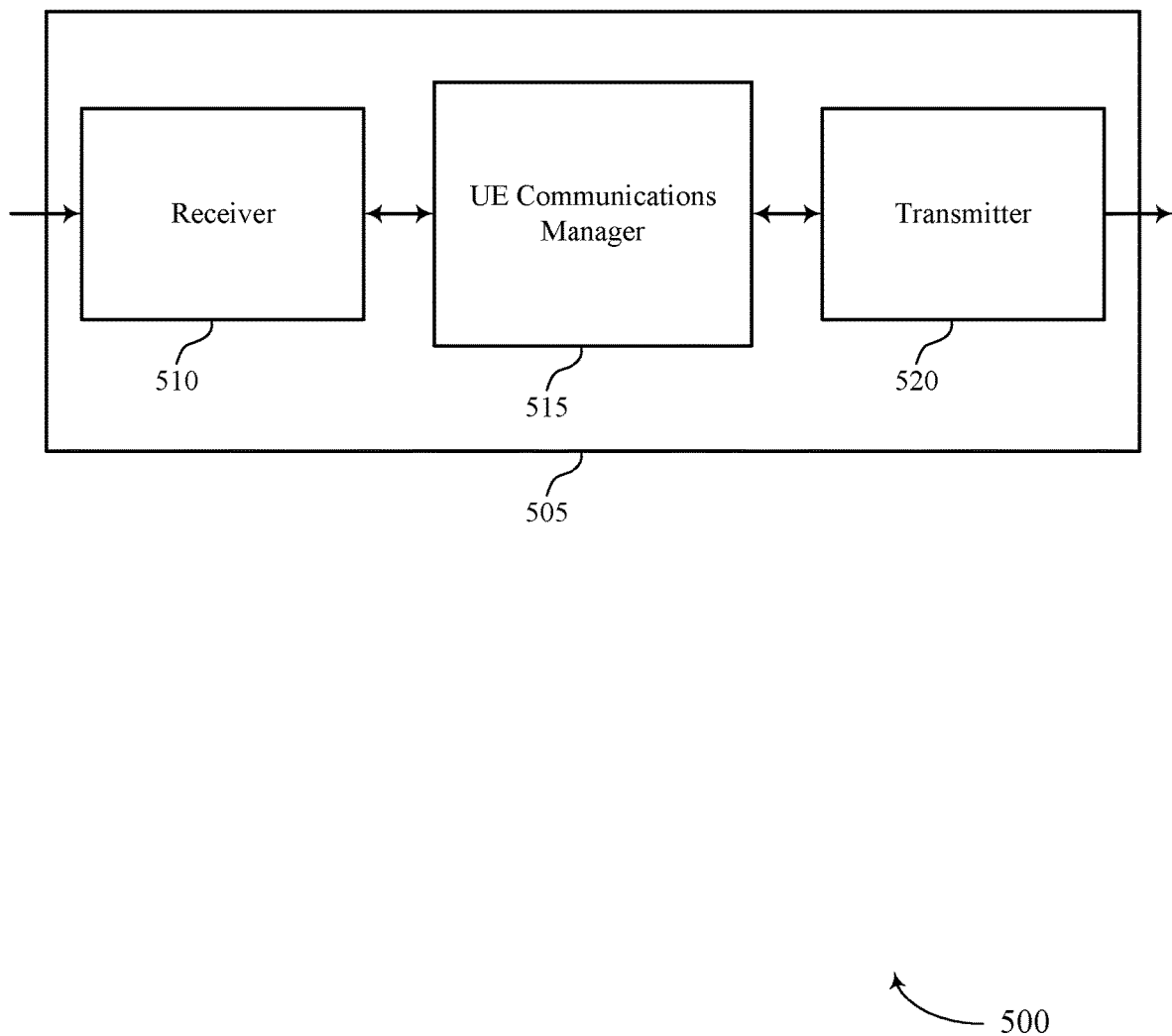
FIGS. 5 through 7 show block diagrams of a device that supports numerology dependent communication timing in accordance with aspects of the present disclosure.

FIG. 5 shows a block diagram 400 of a wireless device 405 that supports numerology dependent communication timing in accordance with aspects of the present disclosure. Wireless device 405 may be an example of aspects of a UE 115 as described herein. Wireless device 405 may include receiver 410, UE communications manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to numerology dependent communication timing, etc.). Information may be passed on to other components of the device. The receiver 410 may be an example of aspects of the transceiver 835 described with reference to FIG. 8. The receiver 410 may utilize a single antenna or a set of antennas.

UE communications manager 415 may be an example of aspects of the UE communications manager 815 described with reference to FIG. 8. UE communications manager 415 and/or at least some of its various sub-components may be implemented in hardware, software executed by a processor, firmware, or any combination thereof. If implemented in software executed by a processor, the functions of the UE communications manager 415 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 415 and/or at least some of its various sub-components may be physically located at various positions, including being distributed such that portions of functions are implemented at different physical locations by one or more physical devices. In some examples, UE communications manager 415 and/or at least some of its various sub-components may be a separate and distinct component in accordance with various aspects of the present disclosure. In other examples, UE communications manager 415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 415 may receive, from a base station, an indication of a numerology to be used for a communication procedure, determine a minimum time gap for the communication procedure based on the numerology, and communicate with the base station in accordance with the minimum time gap. The UE communications manager 415 may also identify that a RACH procedure is to be performed, receive, at a UE, an indication of a numerology to be used for the RACH procedure, and determine a RACH timing to be used by the UE based on the numerology.

Transmitter 420 may transmit signals generated by other components of the device. In some examples, the transmitter 420 may be collocated with a receiver 410 in a transceiver module. For example, the transmitter 420 may be an example of aspects of the transceiver 835 described with reference to FIG. 8. The transmitter 420 may utilize a single antenna or a set of antennas.

Figure 6:
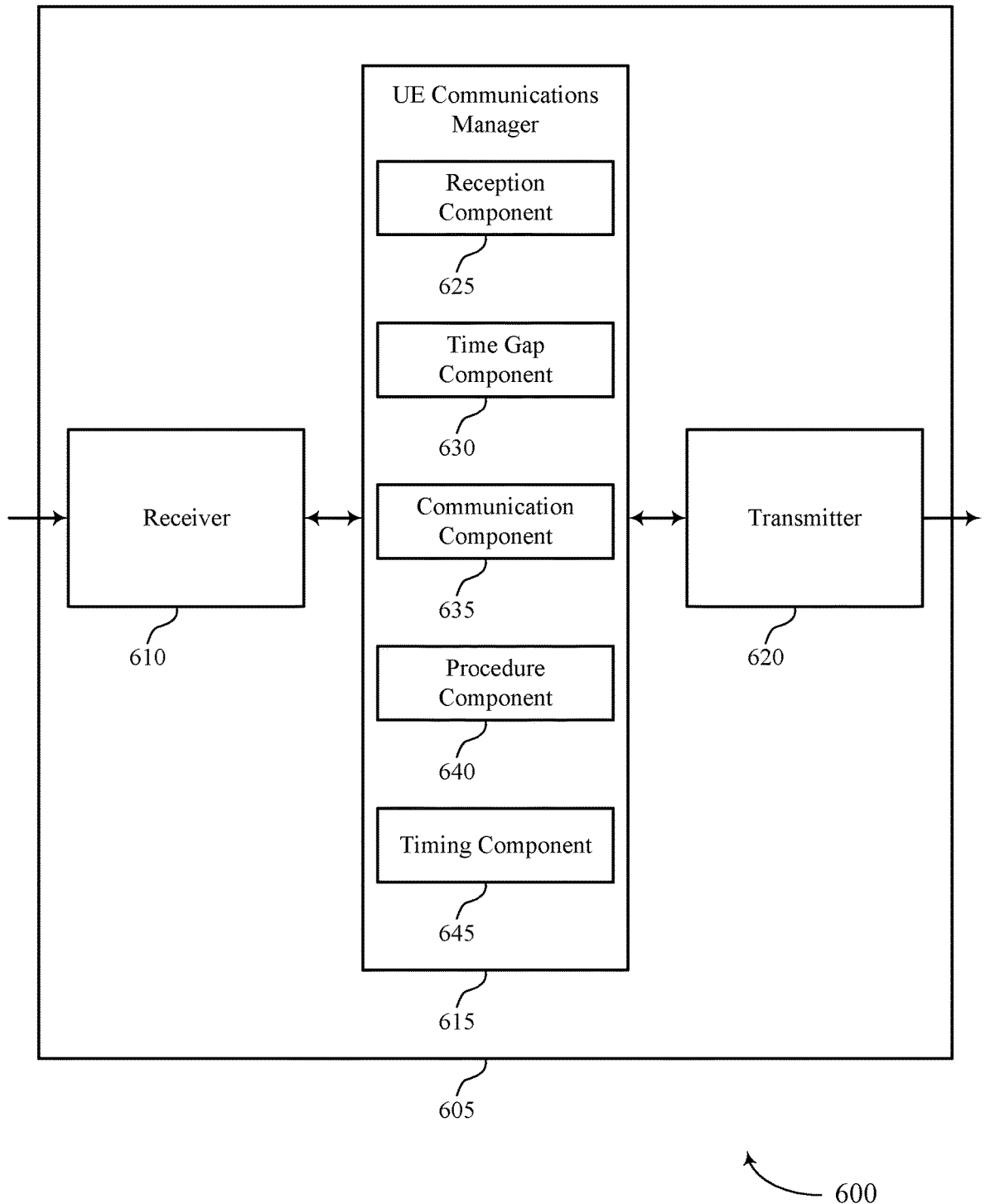

FIG. 6 shows a block diagram 600 of a wireless device 605 that supports numerology dependent communication timing in accordance with aspects of the present disclosure. Wireless device 605 may be an example of aspects of a wireless device 405 or a UE 115 as described with reference to FIG. 4. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to numerology dependent communication timing, etc.). Information may be passed on to other components of the device. The receiver 610 may be an example of aspects of the transceiver 835 described with reference to FIG. 8. The receiver 610 may utilize a single antenna or a set of antennas.

UE communications manager 615 may be an example of aspects of the UE communications manager 815 described with reference to FIG. 8. UE communications manager 615 may also include reception component 625, time gap component 630, communication component 635, procedure component 640, and timing component 645.

Reception component 625 may receive, from a base station, an indication of a numerology to be used for a communication procedure and receive, at a UE, an indication of a numerology to be used for the RACH procedure. In some cases, receiving the indication of the numerology includes: receiving the indication of the numerology via one or more of a MIB, RMSI, a SIB, a PDCCH, an RRC message, a PSS, an SSS, a tertiary synchronization signal, or combinations thereof. In some cases, the communication procedure is a RACH procedure. In some examples, receiving the indication of the numerology includes: receiving the indication of the numerology via one or more of a MIB, RMSI, a SIB, a PDCCH, a RRC message, a PSS, a SSS, a tertiary synchronization signal, or combinations thereof. In some aspects, the PDCCH corresponds to a PDCCH of a RAR grant. In some cases, the RRC message is received through a payload of a RAR.

Time gap component 630 may determine a minimum time gap for the communication procedure based on the numerology. In some cases, the minimum time gap is a minimum wait time for a UE between receipt of a downlink message and transmission of an uplink message in response to the downlink message. In some examples, the downlink message is a grant received via a PDCCH and the uplink message is transmitted via a PUSCH. In some cases, the downlink message is received via a PDSCH and the uplink message is transmitted via a PUCCH. In some aspects, the minimum time gap is an absolute time or a default number of symbols. In some instances, the minimum time gap is a minimum wait time for a UE between receipt of a successfully decoded RAR in a PDSCH and a RRC connection request transmission.

Communication component 635 may communicate with the base station in accordance with the minimum time gap.

Procedure component 640 may identify that a RACH procedure is to be performed.

Timing component 645 may determine a RACH timing to be used by the UE based on the numerology. In some cases, determining the RACH timing includes: determining an absolute amount of time to be used during portions of the RACH procedure. In some cases, determining the RACH timing includes: determining a number of slots to be used during portions of the RACH procedure. In some examples, determining the RACH timing includes: determining the number of symbols to be used during portions of the RACH procedure including a minimum number of symbols that the UE is to wait between receipt of an unsuccessfully decoded RAR in a PDSCH and when the UE is ready to retransmit a RACH message. In some aspects, determining the RACH timing includes: determining the number of symbols to be used during portions of the RACH procedure including a minimum number of symbols that the UE is to wait between a last symbol of a RAR window in which no RAR is received and when the UE is ready to retransmit a RACH message. In some instances, determining the RACH timing includes: determining the number of symbols to be used during portions of the RACH procedure including a minimum number of symbols that the UE is to wait between initiation of a PDCCH order and a RACH message to be transmitted by the UE.

In some cases, determining the RACH timing includes: determining the number of symbols to be used during portions of the RACH procedure including a minimum number of symbols that the UE is to wait between receipt of a PDCCH order and a RACH message to be transmitted by the UE. In some examples, determining the RACH timing includes: determining the number of symbols to be used during portions of the RACH procedure including a minimum number of symbols that the UE is to wait between receipt of a successfully decoded RAR in a PDSCH and an RRC connection request to be transmitted by the UE. In some aspects, the number of symbols to be used during portions of the RACH procedure includes a minimum number of symbols that the UE is to wait between transmission of a PRACH message and a beginning of a RAR window.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
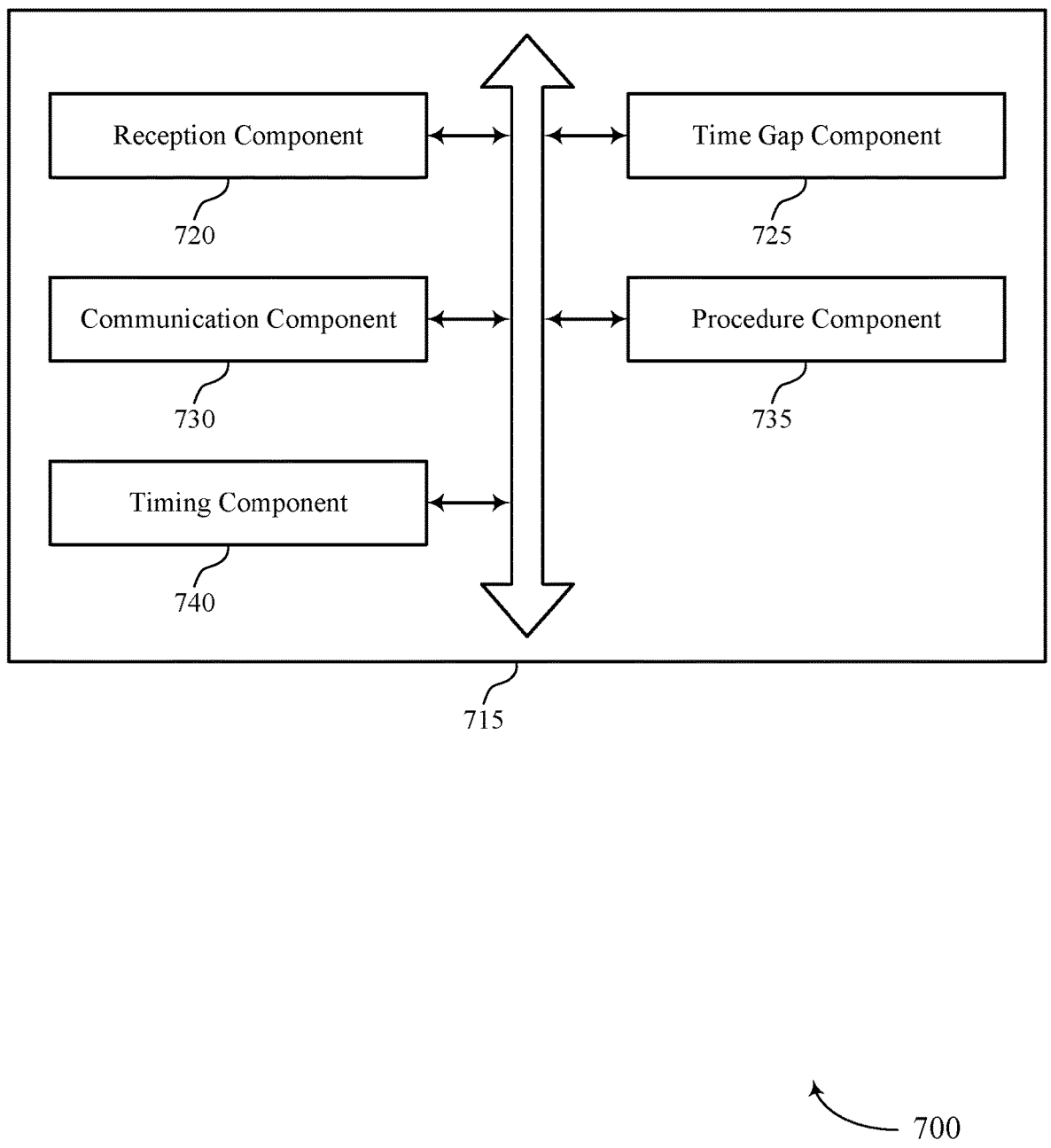

FIG. 7 shows a block diagram 700 of a UE communications manager 715 that supports numerology dependent communication timing in accordance with aspects of the present disclosure. The UE communications manager 715 may be an example of aspects of a UE communications manager 415, a UE communications manager 615, or a UE communications manager 815 described with reference to FIGS. 4, 6, and 8. The UE communications manager 715 may include reception component 720, time gap component 725, communication component 730, procedure component 735, and timing component 740. Each of these modules may communicate, directly or indirectly, with one another (e.g., via one or more buses).

Reception component 720 may receive, from a base station, an indication of a numerology to be used for a communication procedure and receive, at a UE, an indication of a numerology to be used for the RACH procedure. In some cases, receiving the indication of the numerology includes: receiving the indication of the numerology via one or more of a MIB, RMSI, a SIB, a PDCCH, an RRC message, a PSS, an SSS, a tertiary synchronization signal, or combinations thereof. In some cases, the communication procedure is a RACH procedure. In some examples, receiving the indication of the numerology includes: receiving the indication of the numerology via one or more of a MIB, RMSI, a SIB, a PDCCH, a RRC message, a PSS, a SSS, a tertiary synchronization signal, or combinations thereof. In some aspects, the PDCCH corresponds to a PDCCH of a RAR grant. In some instances, the RRC message is received through a payload of a RAR.

Time gap component 725 may determine a minimum time gap for the communication procedure based on the numerology. In some cases, the minimum time gap is a minimum wait time for a UE between receipt of a downlink message and transmission of an uplink message in response to the downlink message. In some examples, the downlink message is a grant received via a PDCCH and the uplink message is transmitted via a PUSCH. In some aspects, the downlink message is received via a PDSCH and the uplink message is transmitted via a PUCCH. In some instances, the minimum time gap is an absolute time or a default number of symbols. In some cases, the minimum time gap is a minimum wait time for a UE between receipt of a successfully decoded RAR in a PDSCH and a RRC connection request transmission.

Communication component 730 may communicate with the base station in accordance with the minimum time gap.

Procedure component 735 may identify that a RACH procedure is to be performed.

Timing component 740 may determine a RACH timing to be used by the UE based on the numerology. In some cases, determining the RACH timing includes: determining an absolute amount of time to be used during portions of the RACH procedure. In some cases, determining the RACH timing includes: determining a number of slots to be used during portions of the RACH procedure. In some examples, determining the RACH timing includes: determining the number of symbols to be used during portions of the RACH procedure including a minimum number of symbols that the UE is to wait between receipt of an unsuccessfully decoded RAR in a PDSCH and when the UE is ready to retransmit a RACH message. In some aspects, determining the RACH timing includes: determining the number of symbols to be used during portions of the RACH procedure including a minimum number of symbols that the UE is to wait between a last symbol of a RAR window in which no RAR is received and when the UE is ready to retransmit a RACH message. In some instances, determining the RACH timing includes: determining the number of symbols to be used during portions of the RACH procedure including a minimum number of symbols that the UE is to wait between initiation of a PDCCH order and a RACH message to be transmitted by the UE.

In some cases, determining the RACH timing includes: determining the number of symbols to be used during portions of the RACH procedure including a minimum number of symbols that the UE is to wait between receipt of a PDCCH order and a RACH message to be transmitted by the UE. In some examples, determining the RACH timing includes: determining the number of symbols to be used during portions of the RACH procedure including a minimum number of symbols that the UE is to wait between receipt of a successfully decoded RAR in a PDSCH and an RRC connection request to be transmitted by the UE. In some aspects, the number of symbols to be used during portions of the RACH procedure includes a minimum number of symbols that the UE is to wait between transmission of a PRACH message and a beginning of a RAR window.

Figure 8:
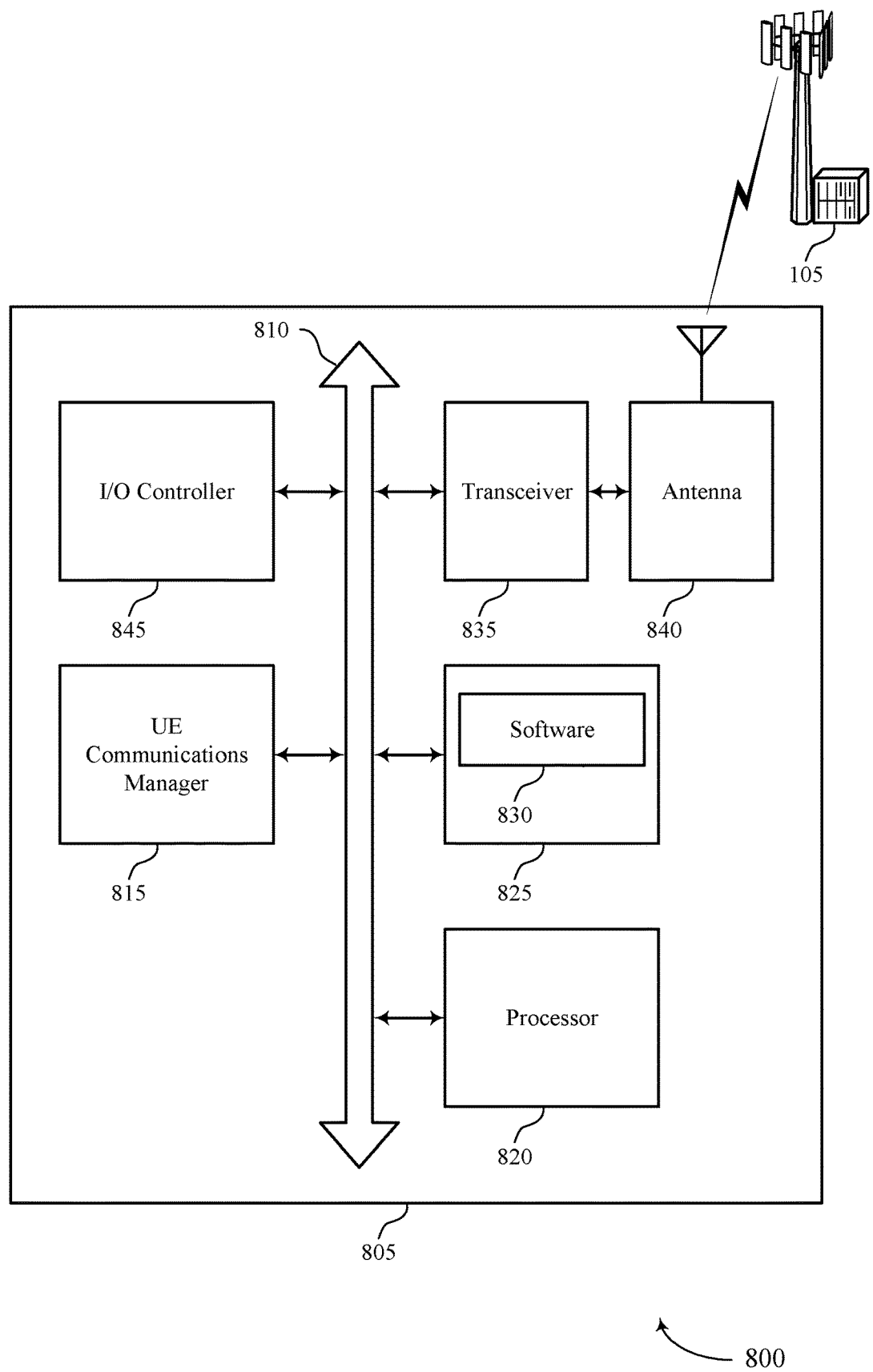
FIG. 8 illustrates a block diagram of a system including a base station that supports numerology dependent communication timing in accordance with aspects of the present disclosure.

FIG. 8 shows a diagram of a system 800 including a device 805 that supports numerology dependent communication timing in accordance with aspects of the present disclosure. Device 805 may be an example of or include the components of wireless device 405, wireless device 605, or a UE 115 as described above, e.g., with reference to FIGS. 4 and 6. Device 805 may include components for bi-directional voice and data communications including components for transmitting and receiving communications, including UE communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting numerology dependent communication timing).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support numerology dependent communication timing. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver.

The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
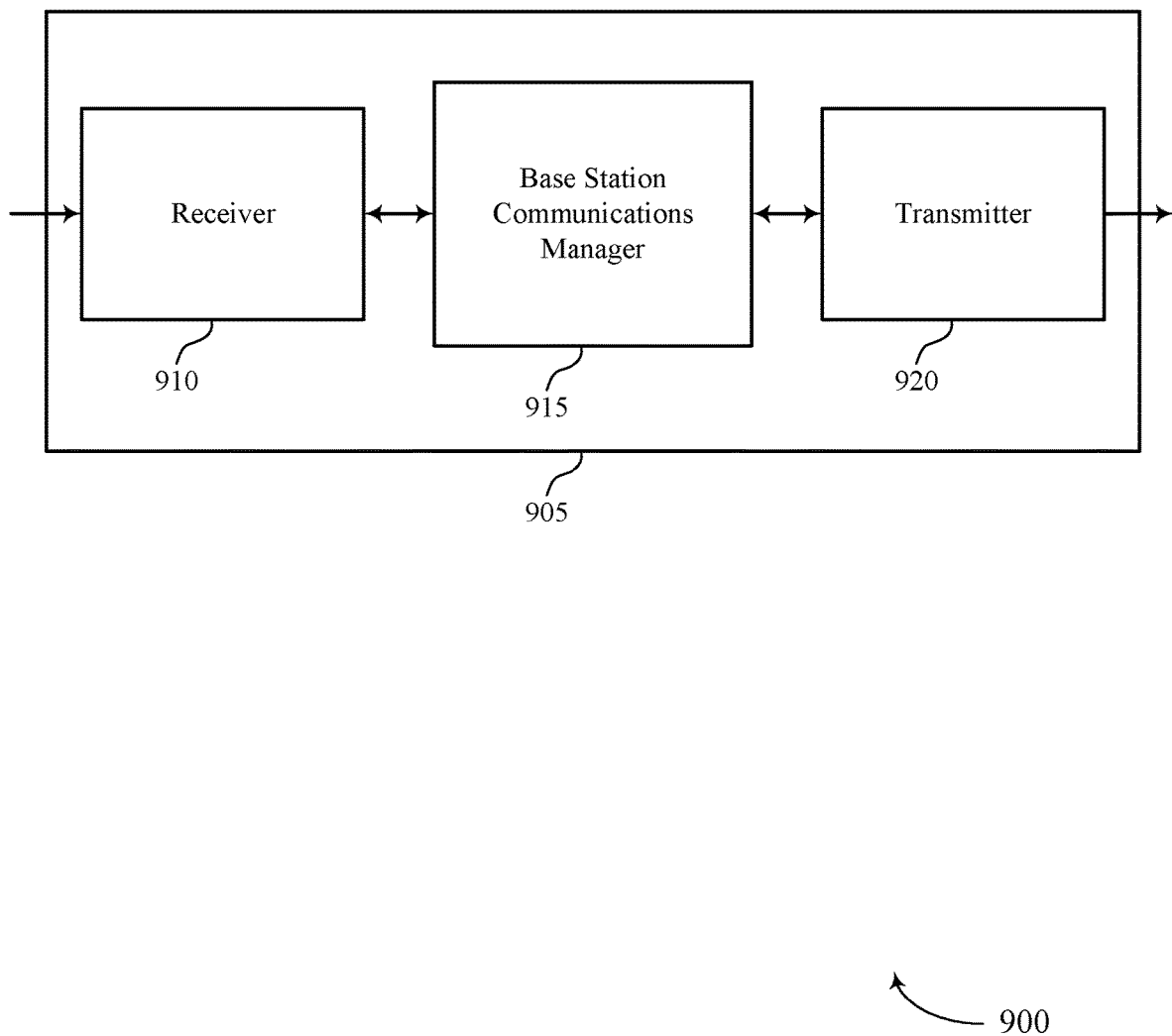
FIGS. 9 through 11 show block diagrams of a device that supports numerology dependent communication timing in accordance with aspects of the present disclosure.

FIG. 9 shows a block diagram 900 of a wireless device 905 that supports numerology dependent communication timing in accordance with aspects of the present disclosure. Wireless device 905 may be an example of aspects of a base station 105 as described herein. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to numerology dependent communication timing, etc.). Information may be passed on to other components of the device. The receiver 910 may be an example of aspects of the transceiver 1235 described with reference to FIG. 12. The receiver 910 may utilize a single antenna or a set of antennas.

Base station communications manager 915 may be an example of aspects of the base station communications manager 1215 described with reference to FIG. 12. Base station communications manager 915 and/or at least some of its various sub-components may be implemented in hardware, software executed by a processor, firmware, or any combination thereof. If implemented in software executed by a processor, the functions of the base station communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 915 and/or at least some of its various sub-components may be physically located at various positions, including being distributed such that portions of functions are implemented at different physical locations by one or more physical devices. In some examples, base station communications manager 915 and/or at least some of its various sub-components may be a separate and distinct component in accordance with various aspects of the present disclosure. In other examples, base station communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 915 may identify a numerology for a communication procedure, convey, to a UE, an indication of the numerology, where the numerology is indicative of a minimum time gap for the communication procedure, and communicate with the UE in accordance with the minimum time gap. The base station communications manager 915 may also identify a numerology to be used for a RACH procedure and convey, to a UE, an indication of the RACH numerology, where the RACH numerology is indicative of a RACH timing for the UE.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
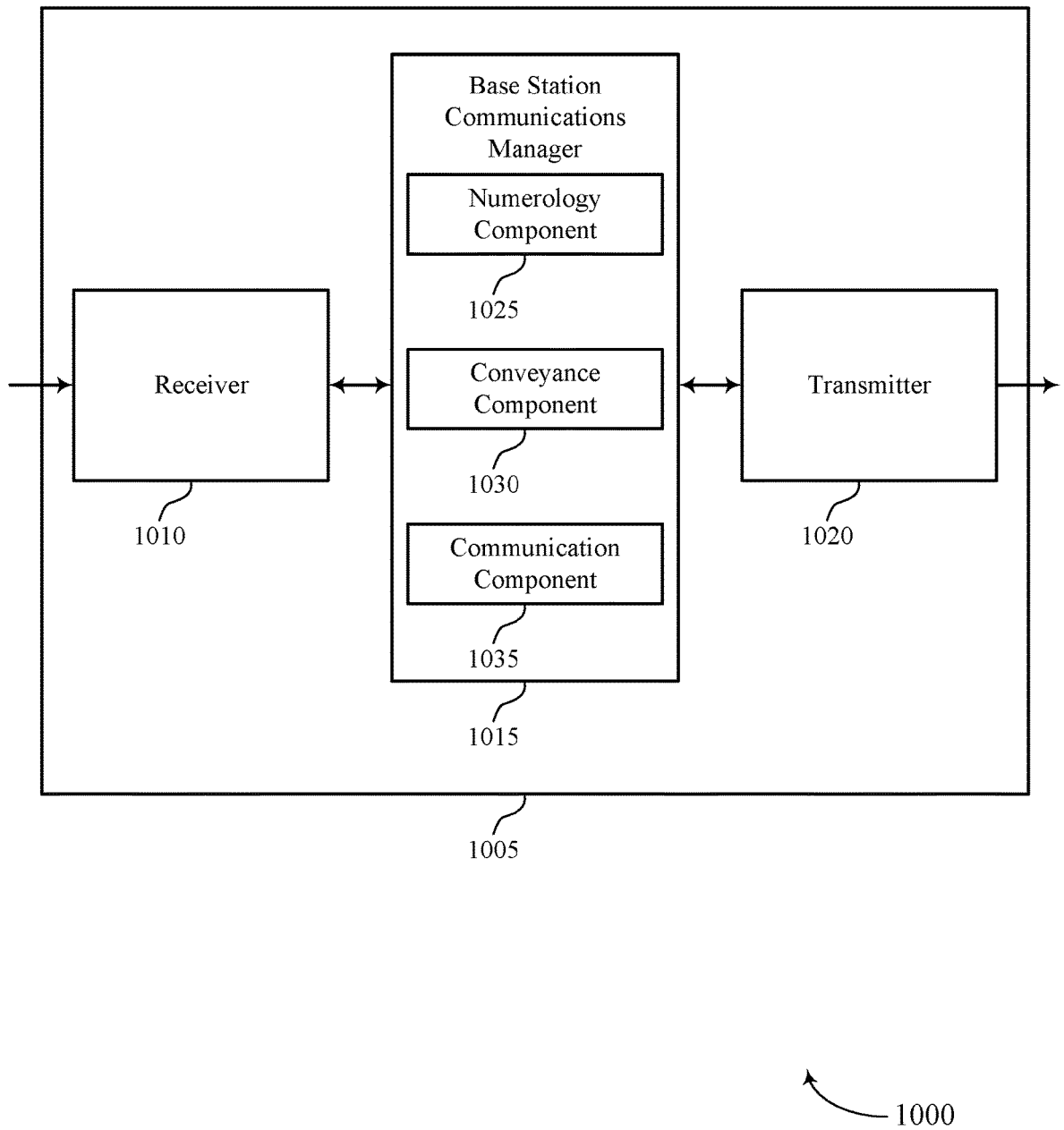

FIG. 10 shows a block diagram 1000 of a wireless device 1005 that supports numerology dependent communication timing in accordance with aspects of the present disclosure. Wireless device 1005 may be an example of aspects of a wireless device 905 or a base station 105 as described with reference to FIG. 9. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to numerology dependent communication timing, etc.). Information may be passed on to other components of the device. The receiver 1010 may be an example of aspects of the transceiver 1235 described with reference to FIG. 12. The receiver 1010 may utilize a single antenna or a set of antennas.

Base station communications manager 1015 may be an example of aspects of the base station communications manager 1215 described with reference to FIG. 12. Base station communications manager 1015 may also include numerology component 1025, conveyance component 1030, and communication component 1035.

Numerology component 1025 may identify a numerology for a communication procedure and identify a numerology to be used for a RACH procedure. In some cases, the communication procedure is a RACH procedure.

Conveyance component 1030 may convey, to a UE, an indication of the numerology, where the numerology is indicative of a minimum time gap for the communication procedure and convey, to a UE, an indication of the RACH numerology, where the RACH numerology is indicative of a RACH timing for the UE. In some cases, the RACH timing includes a number of symbols to be used during portions of the RACH procedure including a minimum number of symbols that the UE is to wait between transmission of a PRACH signal and a beginning of a RAR window. In some examples, the downlink message is a grant received via a PDCCH and the uplink message is transmitted via a PUSCH. In some aspects, the downlink message is received via a PDSCH and the uplink message is transmitted via a PUCCH. In some instances, conveying the indication of the numerology includes: conveying the indication of the numerology via one or more of a MIB, RMSI, a SIB, a PDCCH, an RRC message, a PSS, an SSS, a tertiary synchronization signal, or combinations thereof.

In some cases, the minimum time gap is an absolute time or a default number of symbols. In some examples, the minimum time gap is a minimum wait time for the UE between receipt of a successfully decoded RAR in a PDSCH and response RRC connection request transmission. In some aspects, conveying the indication of the numerology includes: conveying the indication of the numerology via one or more of a MIB, RMSI, a SIB, a PDCCH, an RRC message, a PSS, an SSS, a tertiary synchronization signal, or combinations thereof. In some instances, the minimum time gap is a minimum time between transmission of a downlink message and receipt of an uplink message in response to the downlink message.

In some cases, the RRC message is transmitted through a payload of a RAR. In some examples, the RACH timing includes a number of slots or an absolute amount of time to be used during portions of the RACH procedure. In some aspects, the RACH timing includes a number of symbols to be used during portions of the RACH procedure including a minimum number of symbols that the UE is to wait between receipt of a successfully decoded RAR in a PDSCH and a RRC connection request. In some instances, the RACH timing includes a number of symbols to be used during portions of the RACH procedure including a minimum number of symbols that the UE is to wait between receipt of an unsuccessfully decoded RAR in a PDSCH and a retransmission of a RACH message.

In some cases, the RACH timing includes a number of symbols to be used during portions of the RACH procedure includes a minimum number of symbols that the UE is to wait between a last symbol of a RAR window in which no RAR is received by the UE and retransmission of a RACH message. In some examples, the RACH timing includes a number of symbols to be used during portions of the RACH procedure includes a minimum number of symbols that the UE is to wait between initiation of a PDCCH order and a RACH message. In some aspects, the RACH timing includes a number of symbols to be used during portions of the RACH procedure including a minimum number of symbols that the UE is to wait between receipt of a PDCCH order and a RACH message. In some instances, the PDCCH corresponds to a PDCCH of a RAR grant.

Communication component 1035 may communicate with the UE in accordance with the minimum time gap.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
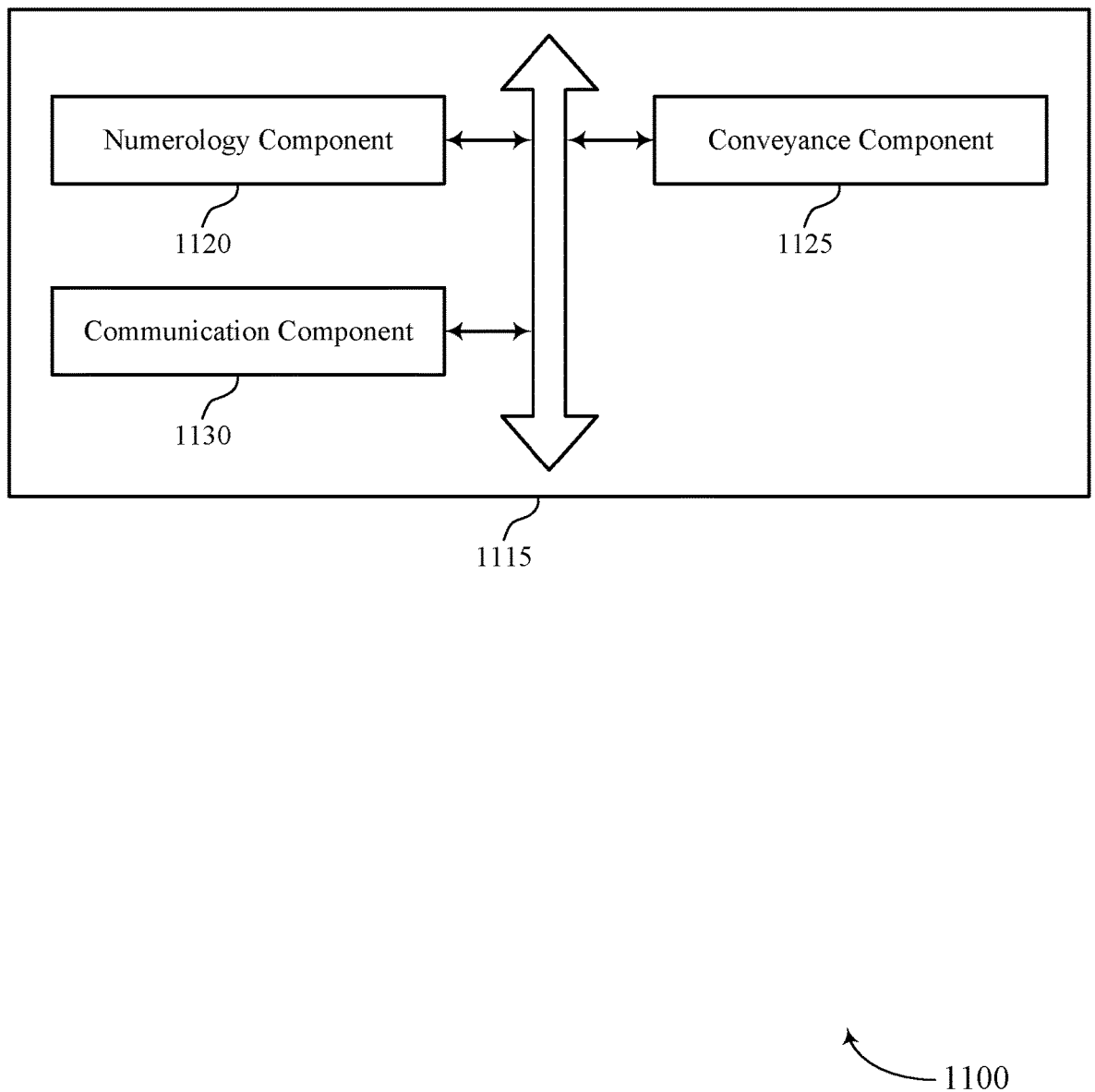

FIG. 11 shows a block diagram 1100 of a base station communications manager 1115 that supports numerology dependent communication timing in accordance with aspects of the present disclosure. The base station communications manager 1115 may be an example of aspects of a base station communications manager 1215 described with reference to FIGS. 9, 10, and 12. The base station communications manager 1115 may include numerology component 1120, conveyance component 1125, and communication component 1130. Each of these modules may communicate, directly or indirectly, with one another (e.g., via one or more buses).

Numerology component 1120 may identify a numerology for a communication procedure and identify a numerology to be used for a RACH procedure. In some cases, the communication procedure is a RACH procedure.

Conveyance component 1125 may convey, to a UE, an indication of the numerology, where the numerology is indicative of a minimum time gap for the communication procedure and convey, to a UE, an indication of the RACH numerology, where the RACH numerology is indicative of a RACH timing for the UE. In some cases, the RACH timing includes a number of symbols to be used during portions of the RACH procedure including a minimum number of symbols that the UE is to wait between transmission of a PRACH signal and a beginning of a RAR window. In some examples, the downlink message is a grant received via a PDCCH and the uplink message is transmitted via a PUSCH. In some aspects, the downlink message is received via a PDSCH and the uplink message is transmitted via a PUCCH. In some instances, conveying the indication of the numerology includes: conveying the indication of the numerology via one or more of a MIB, RMSI, a SIB, a PDCCH, an RRC message, a PSS, an SSS, a tertiary synchronization signal, or combinations thereof.

In some cases, the minimum time gap is an absolute time or a default number of symbols. In some examples, the minimum time gap is a minimum wait time for the UE between receipt of a successfully decoded RAR in a PDSCH and response RRC connection request transmission. In some aspects, conveying the indication of the numerology includes: conveying the indication of the numerology via one or more of a MIB, RMSI, a SIB, a PDCCH, an RRC message, a PSS, an SSS, a tertiary synchronization signal, or combinations thereof. In some instances, the minimum time gap is a minimum time between transmission of a downlink message and receipt of an uplink message in response to the downlink message.

In some cases, the RRC message is transmitted through a payload of a RAR. In some examples, the RACH timing includes a number of slots or an absolute amount of time to be used during portions of the RACH procedure. In some aspects, the RACH timing includes a number of symbols to be used during portions of the RACH procedure including a minimum number of symbols that the UE is to wait between receipt of a successfully decoded RAR in a PDSCH and a RRC connection request. In some instances, the RACH timing includes a number of symbols to be used during portions of the RACH procedure including a minimum number of symbols that the UE is to wait between receipt of an unsuccessfully decoded RAR in a PDSCH and a retransmission of a RACH message.

In some cases, the RACH timing includes a number of symbols to be used during portions of the RACH procedure includes a minimum number of symbols that the UE is to wait between a last symbol of a RAR window in which no RAR is received by the UE and retransmission of a RACH message. In some examples, the RACH timing includes a number of symbols to be used during portions of the RACH procedure includes a minimum number of symbols that the UE is to wait between initiation of a PDCCH order and a RACH message. In some aspects, the RACH timing includes a number of symbols to be used during portions of the RACH procedure including a minimum number of symbols that the UE is to wait between receipt of a PDCCH order and a RACH message. In some instances, the PDCCH corresponds to a PDCCH of a RAR grant.

Communication component 1130 may communicate with the UE in accordance with the minimum time gap.

Figure 12:
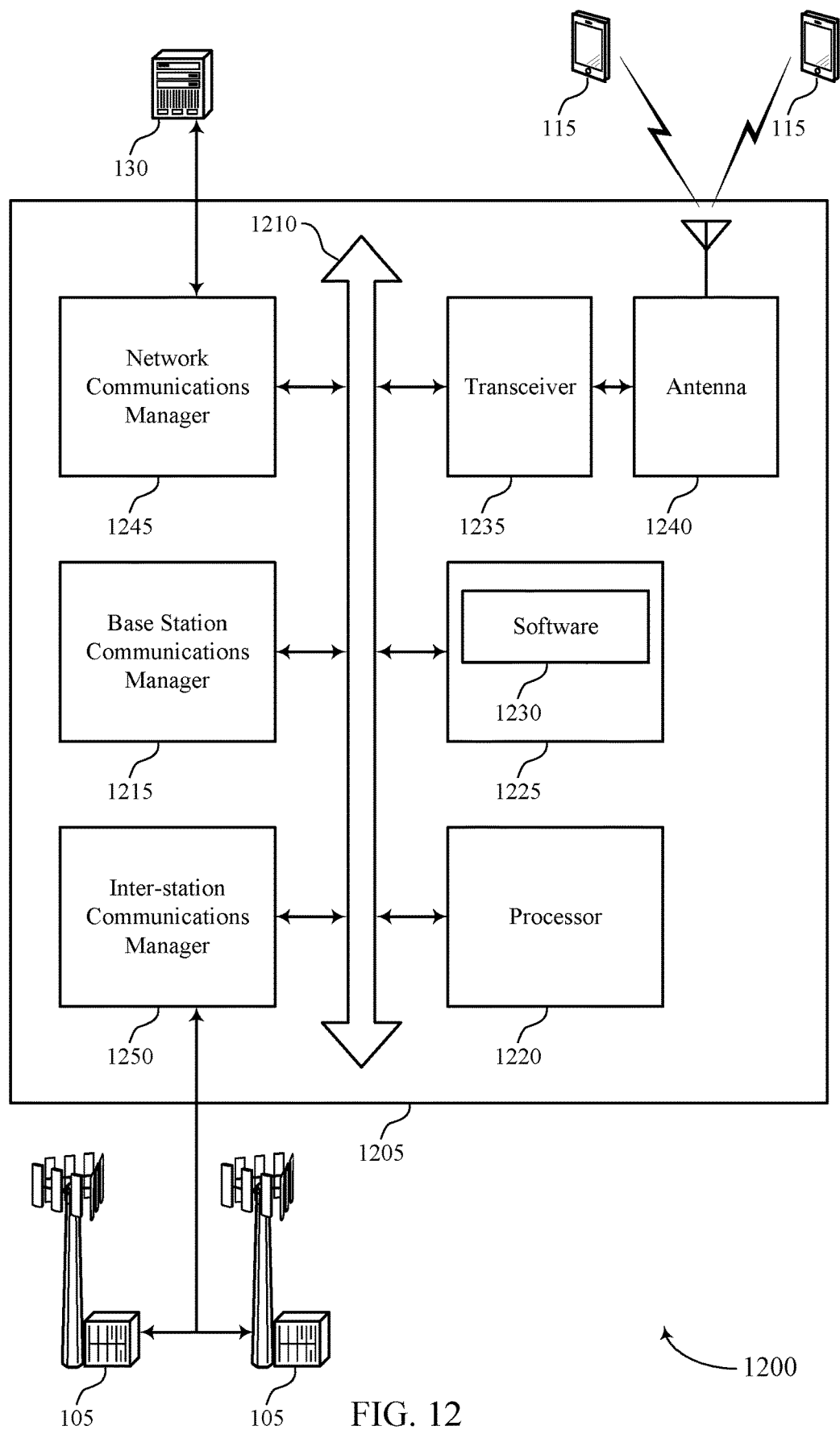
FIG. 12 illustrates a block diagram of a system including a user equipment (UE) that supports numerology dependent communication timing in accordance with aspects of the present disclosure.

FIG. 12 shows a diagram of a system 1200 including a device 1205 that supports numerology dependent communication timing in accordance with aspects of the present disclosure. Device 1205 may be an example of or include the components of base station 105 as described above, e.g., with reference to FIG. 1. Device 1205 may include components for bi-directional voice and data communications including components for transmitting and receiving communications, including base station communications manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting numerology dependent communication timing).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support numerology dependent communication timing. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an LTE/LTE-A wireless communication network technology to provide communication between base stations 105.

Figure 13:
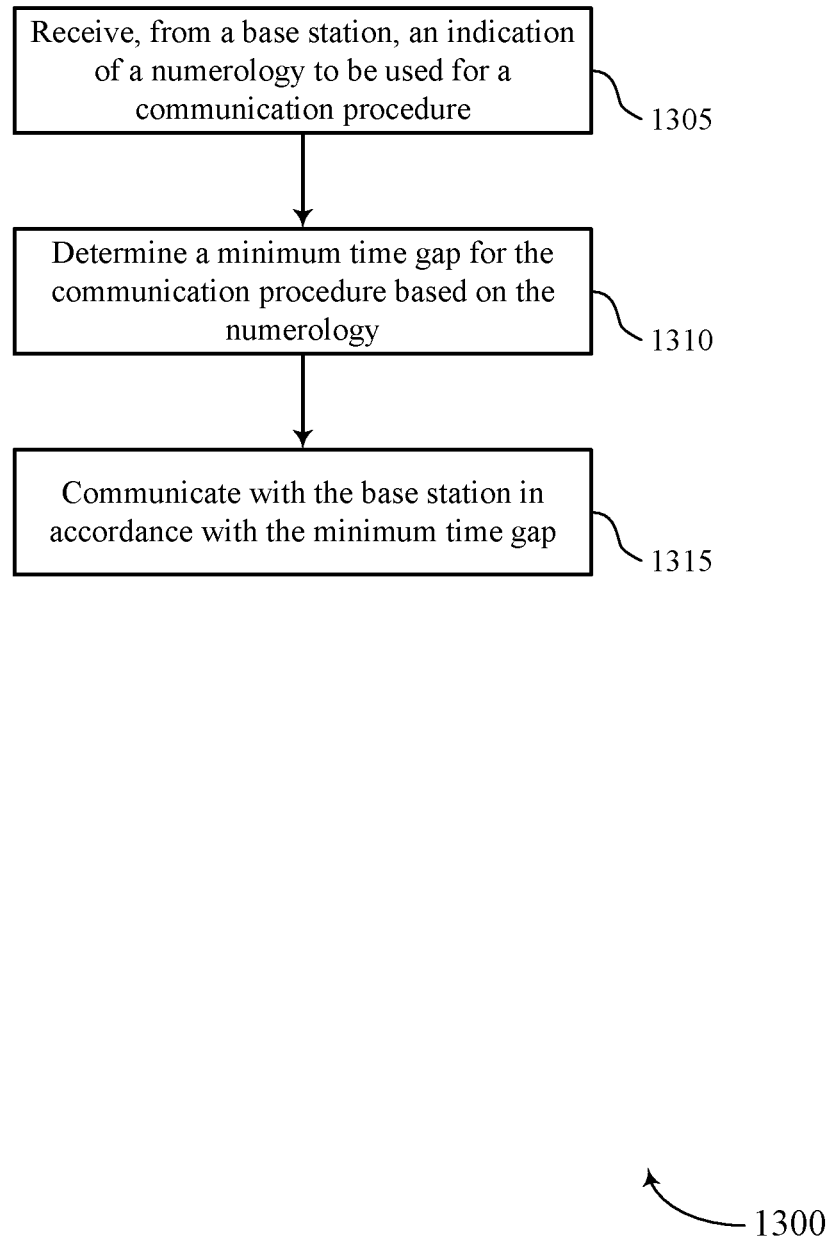
FIGS. 13 through 16 illustrate methods for numerology dependent communication timing in accordance with aspects of the present disclosure.

FIG. 13 shows a flowchart illustrating a method 1300 for numerology dependent communication timing in accordance with aspects of the present disclosure. The operations of method 1300 may be implemented by a UE 115 or its components as described herein. For example, the operations of method 1300 may be performed by a UE communications manager as described with reference to FIGS. 4 through 8. In some examples, a UE 115 may execute a set of codes to control the functional elements of the device to perform the functions described below. Additionally or alternatively, the UE 115 may perform aspects of the functions described below using special-purpose hardware.

At 1305 the UE 115 may receive, from a base station, an indication of a numerology to be used for a communication procedure. The operations of 1305 may be performed according to the methods described herein. In certain examples, aspects of the operations of 1305 may be performed by a reception component as described with reference to FIGS. 4 through 8.

At 1310 the UE 115 may determine a minimum time gap for the communication procedure based at least in part on the numerology. The operations of 1310 may be performed according to the methods described herein. In certain examples, aspects of the operations of 1310 may be performed by a time gap component as described with reference to FIGS. 4 through 8.

At 1315 the UE 115 may communicate with the base station in accordance with the minimum time gap. The operations of 1315 may be performed according to the methods described herein. In certain examples, aspects of the operations of 1315 may be performed by a communication component as described with reference to FIGS. 4 through 8.

Figure 14:
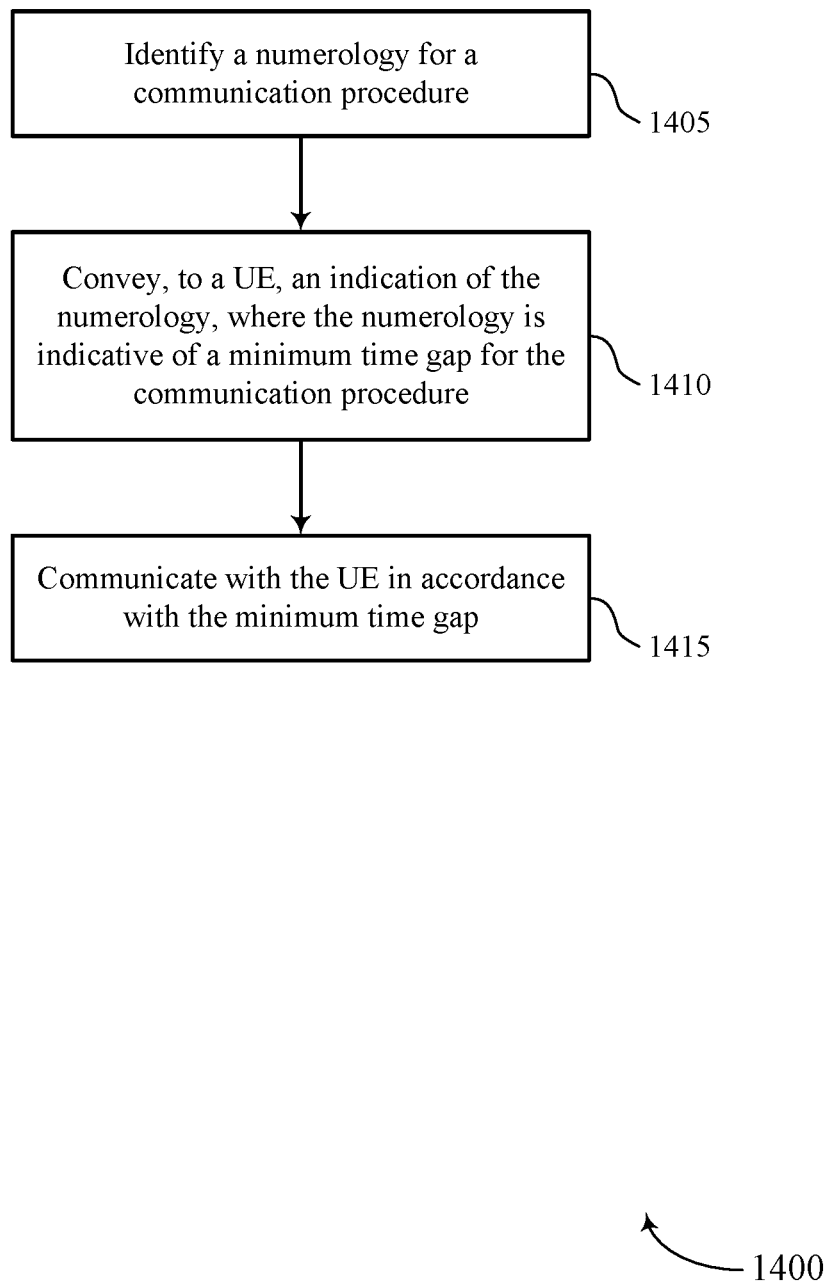

FIG. 14 shows a flowchart illustrating a method 1400 for numerology dependent communication timing in accordance with aspects of the present disclosure. The operations of method 1400 may be implemented by a base station 105 or its components as described herein. For example, the operations of method 1400 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At 1405 the base station 105 may identify a numerology for a communication procedure. The operations of 1405 may be performed according to the methods described herein. In certain examples, aspects of the operations of 1405 may be performed by a numerology component as described with reference to FIGS. 9 through 12.

At 1410 the base station 105 may convey, to a UE, an indication of the numerology, wherein the numerology is indicative of a minimum time gap for the communication procedure. The operations of 1410 may be performed according to the methods described herein. In certain examples, aspects of the operations of 1410 may be performed by a conveyance component as described with reference to FIGS. 9 through 12.

At 1415 the base station 105 may communicate with the UE in accordance with the minimum time gap. The operations of 1415 may be performed according to the methods described herein. In certain examples, aspects of the operations of 1415 may be performed by a communication component as described with reference to FIGS. 9 through 12.

Figure 15:
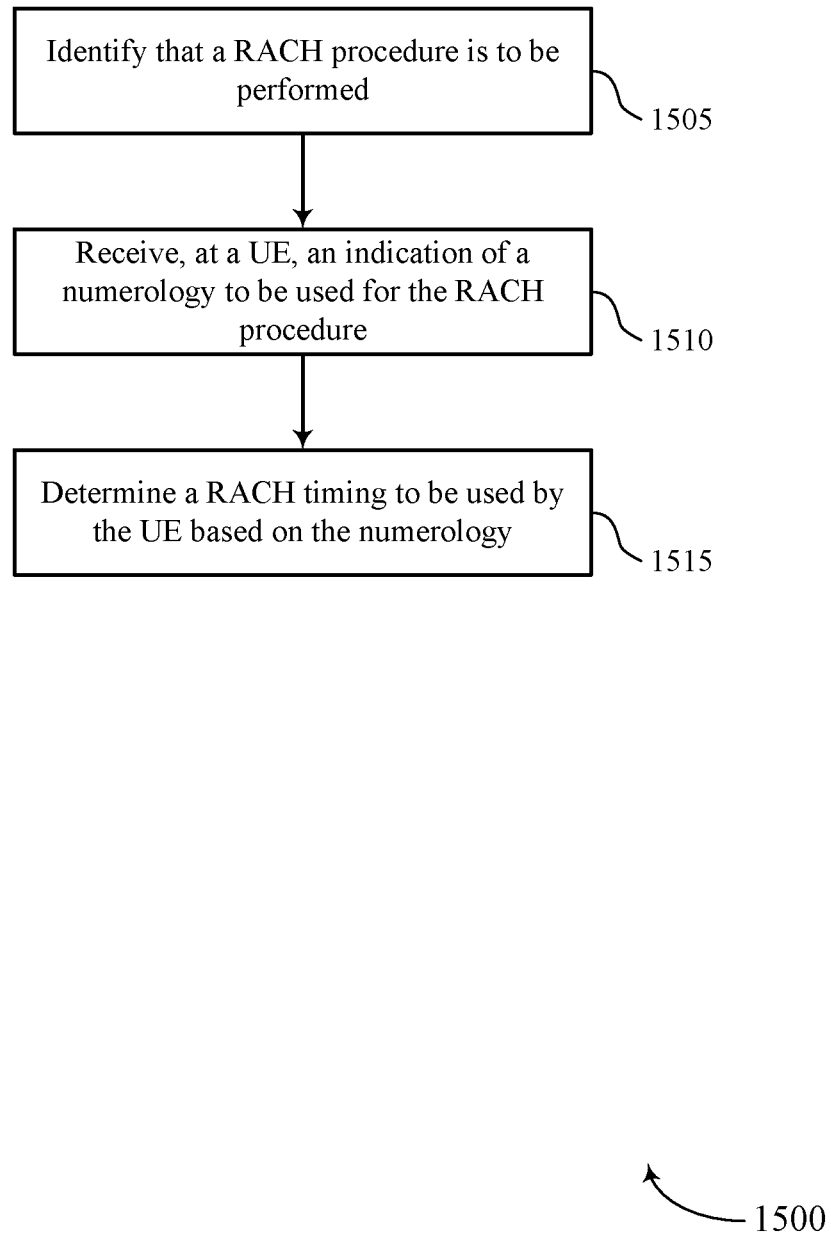

FIG. 15 shows a flowchart illustrating a method 1500 for numerology dependent communication timing in accordance with aspects of the present disclosure. The operations of method 1500 may be implemented by a UE 115 or its components as described herein. For example, the operations of method 1500 may be performed by a UE communications manager as described with reference to FIGS. 4 through 8. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may identify that a RACH procedure is to be performed. The operations of 1505 may be performed according to the methods described herein. In certain examples, aspects of the operations of 1505 may be performed by a procedure component as described with reference to FIGS. 4 through 8.

At 1510 the UE 115 may receive, at a UE, an indication of a numerology to be used for the RACH procedure. The operations of 1510 may be performed according to the methods described herein. In certain examples, aspects of the operations of 1510 may be performed by a reception component as described with reference to FIGS. 4 through 8.

At 1515 the UE 115 may determine a RACH timing to be used by the UE based at least in part on the numerology. The operations of 1515 may be performed according to the methods described herein. In certain examples, aspects of the operations of 1515 may be performed by a timing component as described with reference to FIGS. 4 through 8.

Figure 16:
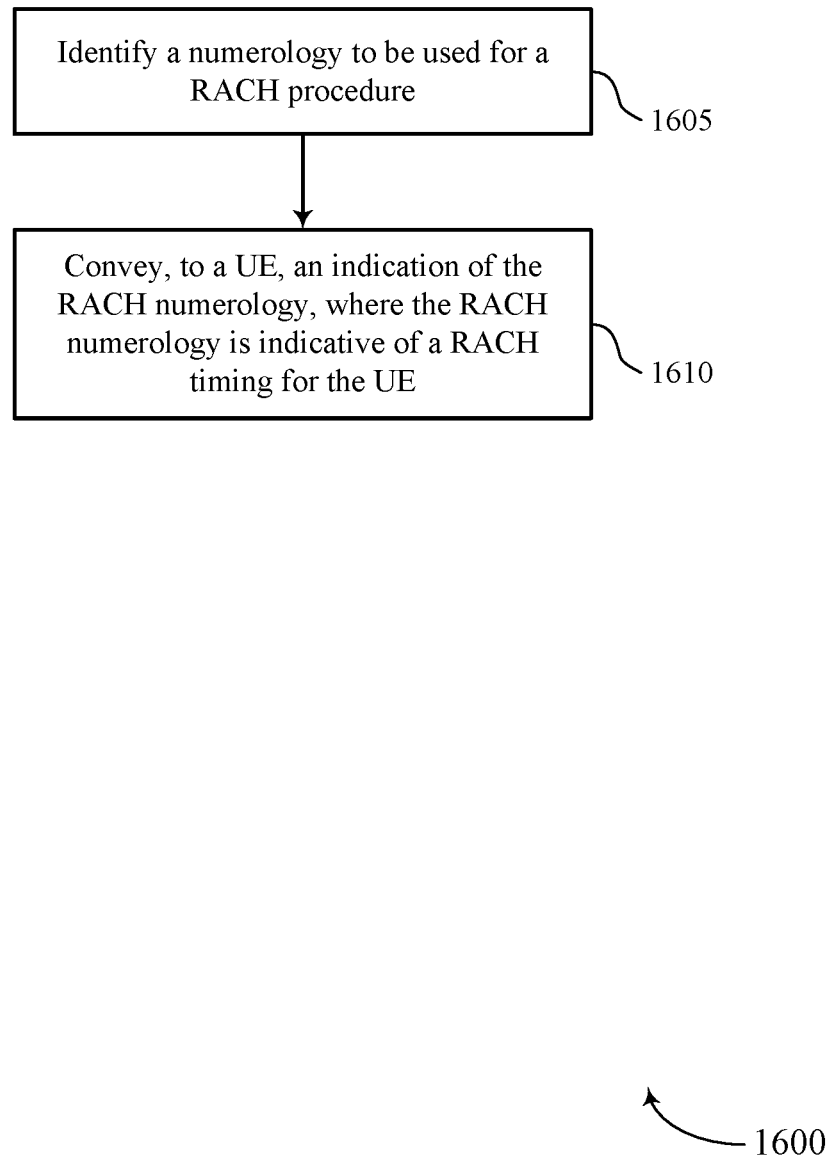

FIG. 16 shows a flowchart illustrating a method 1600 for numerology dependent communication timing in accordance with aspects of the present disclosure. The operations of method 1600 may be implemented by a base station 105 or its components as described herein. For example, the operations of method 1600 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At 1605 the base station 105 may identify a numerology to be used for a RACH procedure. The operations of 1605 may be performed according to the methods described herein. In certain examples, aspects of the operations of 1605 may be performed by a numerology component as described with reference to FIGS. 9 through 12.

At 1610 the base station 105 may convey, to a UE, an indication of the RACH numerology, wherein the RACH numerology is indicative of a RACH timing for the UE. The operations of 1610 may be performed according to the methods described herein. In certain examples, aspects of the operations of 1610 may be performed by a conveyance component as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100, 200, or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving, from a base station, an indication of a numerology to be used for a communication procedure;
   determining a minimum time interval for the communication procedure based at least in part on a minimum time gap and a time value, wherein the minimum time gap is an absolute time and the time value is based at least in part on a number of symbols having a symbol duration corresponding to the numerology, wherein the minimum time interval provides a minimum wait time for the UE between receipt of a downlink message and transmission of an uplink message in response to the downlink message; and
   communicating with the base station in accordance with the minimum time interval.

2. The method of claim 1, wherein the downlink message is a grant received via a physical downlink control channel (PDCCH) and the uplink message is transmitted via a physical uplink shared channel (PUSCH).

3. The method of claim 1, wherein the downlink message is received via a physical downlink shared channel (PDSCH) and a corresponding uplink message is transmitted via a physical uplink control channel (PUCCH).

4. The method of claim 1, wherein receiving the indication of the numerology comprises:
   receiving the indication of the numerology via one or more of a master information block (MIB), remaining minimum system information (RMSI), a system information block (SIB), a physical downlink control channel (PDCCH), a radio resource control (RRC) message, a primary synchronization signal (PSS), a secondary synchronization signal (SSS), a tertiary synchronization signal, or combinations thereof.

5. The method of claim 1, wherein the number of symbols having a symbol duration corresponding to the numerology is a default number of symbols.

6. The method of claim 1, wherein the communication procedure is a random access channel (RACH) procedure.

7. The method of claim 6, wherein the minimum time interval is a minimum wait time for the UE between receipt of a successfully decoded random access response (RAR) in a physical downlink shared channel (PDSCH) and a radio resource control (RRC) connection request transmission.

8. A method for wireless communications at a base station, comprising:
   identifying a numerology for a communication procedure;
   conveying, to a user equipment (UE), an indication of the numerology, wherein the numerology is indicative of a minimum time interval for the communication procedure, wherein the minimum time interval comprises a minimum time gap and a time value, and the minimum time gap is an absolute time and the time value is based at least in part on a number of symbols having a symbol duration corresponding to the numerology, and wherein the minimum time interval provides a minimum time between transmission of a downlink message and receipt of an uplink message in response to the downlink message; and
   communicating with the UE in accordance with the minimum time interval.

9. The method of claim 8, wherein the downlink message is a grant received via a physical downlink control channel (PDCCH) and the uplink message is transmitted via a physical uplink shared channel (PUSCH).

10. The method of claim 8, wherein the downlink message is received via a physical downlink shared channel (PDSCH) and a corresponding uplink message is transmitted via a physical uplink control channel (PUCCH).

11. The method of claim 8, wherein conveying the indication of the numerology comprises:
    conveying the indication of the numerology via one or more of a master information block (MIB), remaining minimum system information (RMSI), a system information block (SIB), a physical downlink control channel (PDCCH), a radio resource control (RRC) message, a primary synchronization signal (PSS), a secondary synchronization signal (SSS), a tertiary synchronization signal, or combinations thereof.

12. The method of claim 8, wherein the number of symbols having a symbol duration corresponding to the numerology is a default number of symbols.

13. The method of claim 8, wherein the communication procedure is a random access channel (RACH) procedure.

14. The method of claim 13, wherein the minimum time interval is a minimum wait time for the UE between receipt of a successfully decoded random access response (RAR) in a physical downlink shared channel (PDSCH) and response radio resource control (RRC) connection request transmission.

15. An apparatus for wireless communications, comprising:
a processor;
memory in electronic communication with the processor; and
instructions stored in the memory and executable by the processor to cause the apparatus to:
receive, from a base station, an indication of a numerology to be used for a communication procedure;
determine a minimum time interval for the communication procedure based at least in part on a minimum time gap and a time value, wherein the minimum time gap is an absolute time and the time value is based at least in part on a number of symbols having a symbol duration corresponding to the numerology, wherein the minimum time interval provides a minimum wait time for a user equipment (UE) between receipt of a downlink message and transmission of an uplink message in response to the downlink message; and
communicate with the base station in accordance with the minimum time interval.

16. The apparatus of claim 15, wherein the downlink message is received via a physical downlink shared channel (PDSCH) and a corresponding uplink message is transmitted via a physical uplink control channel (PUCCH).

17. The apparatus of claim 15, wherein the downlink message is received via a physical downlink shared channel (PDSCH) and a corresponding uplink message is transmitted via a physical uplink control channel (PUCCH).

18. The apparatus of claim 15, wherein the instructions to receive the indication of the numerology are executable by the processor to cause the apparatus to:
receive the indication of the numerology via one or more of a master information block (MIB), remaining minimum system information (RMSI), a system information block (SIB), a physical downlink control channel (PDCCH), a radio resource control (RRC) message, a primary synchronization signal (PSS), a secondary synchronization signal (SSS), a tertiary synchronization signal, or combinations thereof.

19. The apparatus of claim 15, wherein the number of symbols having a symbol duration corresponding to the numerology is a default number of symbols.

20. The apparatus of claim 15, wherein the communication procedure is a random access channel (RACH) procedure.

21. The apparatus of claim 20, wherein the minimum time interval is a minimum wait time for the UE between receipt of a successfully decoded random access response (RAR) in a physical downlink shared channel (PDSCH) and a radio resource control (RRC) connection request transmission.

22. An apparatus for wireless communications, comprising:
a processor;
memory in electronic communication with the processor; and
instructions stored in the memory and executable by the processor to cause the apparatus to:
identify a numerology for a communication procedure;
convey, to a user equipment (UE), an indication of the numerology, wherein the numerology is indicative of a minimum time interval for the communication procedure, wherein the minimum time interval comprises a minimum time gap and a time value, and wherein the minimum time gap is an absolute time and the time value is based at least in part on a number of symbols having a symbol duration corresponding to the numerology, and wherein the minimum time interval provides a minimum time between transmission of a downlink message and receipt of an uplink message in response to the downlink message; and
communicate with the UE in accordance with the minimum time interval.

23. The apparatus of claim 22, wherein the downlink message is a grant received via a physical downlink control channel (PDCCH) and the uplink message is transmitted via a physical uplink shared channel (PUSCH).

24. The apparatus of claim 22, wherein the downlink message is received via a physical downlink shared channel (PDSCH) and a corresponding uplink message is transmitted via a physical uplink control channel (PUCCH).

25. The apparatus of claim 22, wherein the instructions to convey the indication of the numerology are executable by the processor to cause the apparatus to:
convey the indication of the numerology via one or more of a master information block (MIB), remaining minimum system information (RMSI), a system information block (SIB), a physical downlink control channel (PDCCH), a radio resource control (RRC) message, a primary synchronization signal (PSS), a secondary synchronization signal (SSS), a tertiary synchronization signal, or combinations thereof.

26. The apparatus of claim 22, wherein the number of symbols having a symbol duration corresponding to the numerology is a default number of symbols.

* * * * *